(12) United States Patent
Kitagawa et al.

(10) Patent No.: US 7,746,435 B2
(45) Date of Patent: Jun. 29, 2010

(54) LIQUID CRYSTAL PANEL AND LIQUID CRYSTAL DISPLAY APPARATUS

(75) Inventors: Takeharu Kitagawa, Osaka (JP); Kentarou Takeda, Osaka (JP); Hiroyuki Yoshimi, Osaka (JP); Nao Murakami, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 160 days.

(21) Appl. No.: 11/802,128

(22) Filed: May 21, 2007

(65) Prior Publication Data

US 2007/0273816 A1 Nov. 29, 2007

(30) Foreign Application Priority Data

May 24, 2006 (JP) ............................. 2006-144382
Feb. 15, 2007 (JP) ............................. 2007-034343

(51) Int. Cl.
*G02F 1/13363* (2006.01)
(52) U.S. Cl. ...................................... 349/119
(58) Field of Classification Search .................. 349/119
See application file for complete search history.

(56) References Cited

U.S. PATENT DOCUMENTS

| 7,054,049 | B2 | 5/2006 | Murakami et al. |
| 7,128,952 | B2 | 10/2006 | Murakami et al. |
| 7,153,547 | B2 | 12/2006 | Nishikouji et al. |
| 7,494,689 | B2 * | 2/2009 | Hayashi et al. ............ 427/162 |
| 2003/0169391 | A1 | 9/2003 | Uchida et al. |
| 2004/0202849 | A1 | 10/2004 | Nishikouji et al. |
| 2005/0030456 | A1 | 2/2005 | Murakami et al. |
| 2005/0078245 | A1 | 4/2005 | Sasaki et al. |
| 2005/0099562 | A1 | 5/2005 | Nishikouji et al. |
| 2005/0231839 | A1 | 10/2005 | Murakami et al. |
| 2005/0243252 | A1 | 11/2005 | Matsuoka |
| 2005/0249962 | A1 * | 11/2005 | Chen et al. .................. 428/480 |
| 2006/0007375 | A1 | 1/2006 | Nagashima et al. |

FOREIGN PATENT DOCUMENTS

CN 1508606 A 6/2004

(Continued)

OTHER PUBLICATIONS

Office Action of Corresponding Japanese Patent Application No. 2007-034343 mailed Aug. 7, 2007.

*Primary Examiner*—Jerry T Rahll
(74) *Attorney, Agent, or Firm*—Westerman, Hattori, Daniels & Adrian, LLP

(57) ABSTRACT

To provide a liquid crystal panel suitable for a liquid crystal display apparatus and capable of providing colorless neutral displays in all directions, and a liquid crystal display apparatus using the liquid crystal panel, the liquid crystal panel of the present invention includes: a liquid crystal cell; a first polarizer arranged on one side of the liquid crystal cell; a first birefringent layer arranged between the liquid crystal cell and the first polarizer; a second polarizer arranged on another side of the liquid crystal cell; and a second birefringent layer arranged between the liquid crystal cell and the second polarizer; in which: the first birefringent layer has a relationship of $1 < Nz \leq 2$ where an Nz coefficient is defined by $Nz=(nx-nz)/(nx-ny)$; and the second birefringent layer has a refractive index profile of $nx=ny>nz$.

8 Claims, 19 Drawing Sheets

FOREIGN PATENT DOCUMENTS

| | | |
|---|---|---|
| CN | 1623107 A | 6/2005 |
| JP | 11-95208 A | 4/1999 |
| JP | 2001-042128 A | 2/2001 |
| JP | 2002-062430 A | 2/2002 |
| JP | 2003-075637 A | 3/2003 |
| JP | 2006-10912 A | 1/2006 |
| JP | 2006/078847 A | 3/2006 |
| JP | 2006-91920 A | 4/2006 |
| KR | 10-2005-0007324 A | 1/2005 |
| KR | 10-2006-0049640 A | 5/2006 |

* cited by examiner

VIEWER SIDE

BACKLIGHT SIDE

LIQUID CRYSTAL PANEL AND LIQUID CRYSTAL DISPLAY APPARATUS

This application claims priority under 35 U.S.C. Section 119 to Japanese Patent Applications No. 2006-144382 filed on May 24, 2006 and No. 2007-034343 filed on Feb. 15, 2007, which are herein incorporated by reference.

BACKGROUND OF THE INVENTION

1. Field of the Invention

The present invention relates to a liquid crystal panel and to a liquid crystal display apparatus. In particular, the present invention relates to a liquid crystal panel suitable for a liquid crystal display apparatus and capable of providing colorless neutral displays in all directions, and to a liquid crystal display apparatus using the liquid crystal panel.

2. Description of the Related Art

FIG. 5A is a schematic sectional view of a typical conventional liquid crystal display apparatus, and FIG. 5B is a schematic sectional view of a liquid crystal cell to be used for the liquid crystal display apparatus. A liquid crystal display apparatus 900 is provided with: a liquid crystal cell 910; retardation plates 920 and 920' arranged on both sides of the liquid crystal cell 910; and polarizing plates 930 and 930' arranged on outer sides of the respective retardation plates 920 and 920'. Typically, the polarizing plates 930 and 930' are arranged such that respective polarization axes are perpendicular to each other. The liquid crystal cell 910 includes: a pair of substrates 911 and 911'; and a liquid crystal layer 912 as a display medium arranged between the substrates. One substrate 911 is provided with: a switching element (typically, TFT) for controlling electrooptic properties of liquid crystals; and a scanning line for providing a gate signal to this switching element and a signal line for providing a source signal thereto (the element and the lines not shown). The other substrate 911' is provided with: color layers 913R, 913G, and 913B forming a color filter; and a screen layer (black matrix layer) 914. A distance (cell gap) between the substrates 911 and 911' is controlled by a spacer (not shown).

The retardation plates are used for optical compensation of the liquid crystal display apparatus. In order to obtain optimum optical compensation (improvement in viewing angle properties, color shift, and contrast, for example), various attempts have been made in optimization of optical properties of the retardation plates and/or arrangement of the retardation plates in the liquid crystal display apparatus. As shown in FIG. 5A, the retardation plates are conventionally each arranged between the liquid crystal cell 910, and the polarizing plates 930 or 930' (see JP 11-95208 A, for example)

Further improvement in screen evenness and in display quality has been demanded for a recent high-resolution and high-performance liquid crystal display apparatus. However, the conventional liquid crystal display apparatus hardly develops a colorless neutral display in all azimuth angle directions. Further, with development of a small and portable liquid crystal display apparatus, a demand for reduction in thickness of the liquid crystal display apparatus has increased.

SUMMARY OF THE INVENTION

The present invention has been made in view of solving conventional problems described above, and an object of the present invention is to provide a liquid crystal panel suitable for a liquid crystal display apparatus and capable of providing colorless neutral displays in all directions and a liquid crystal display apparatus using the liquid crystal panel.

The liquid crystal panel of the present invention includes: a liquid crystal cell; a first polarizer arranged on one side of the liquid crystal cell; a first birefringent layer arranged between the liquid crystal cell and the first polarizer; a second polarizer arranged on another side of the liquid crystal cell; and a second birefringent layer arranged between the liquid crystal cell and the second polarizer; in which: the first birefringent layer has a relationship of $1<Nz\leqq 2$ where an Nz coefficient is defined by $Nz=(nx-nz)/(nx-ny)$; and the second birefringent layer has a refractive index profile of $nx=ny>nz$.

According to a preferred embodiment, the first birefringent layer includes a cyclic olefin-based film.

According to a further preferred embodiment, the cyclic olefin-based film includes a fixed-end stretched film.

In addition, according to a further preferred embodiment, the cyclic olefin-based film includes a film obtained through stretching at a stretching temperature of 130 to 160° C. and a stretching ratio of 1.2 to 4.0 times.

According to a preferred embodiment, the first birefringent layer includes a cellulose-based film.

According to a further preferred embodiment, the cellulose-based film includes a film obtained through free-end stretching in an MD direction at a stretching temperature of 120 to 160° C. and a stretching ratio of 1.2 to 2.0 times and free-end stretching in a TD direction at a stretching temperature of 120 to 160° C. and a stretching ratio of 1.01 to 1.05 times.

According to a preferred embodiment, the liquid crystal cell employs one of VA mode and OCB mode.

Further, the other aspect of the present invention provides a liquid crystal display apparatus. This liquid crystal display apparatus includes the liquid crystal panel of the present invention.

According to the present invention, a liquid crystal panel suitable for a liquid crystal display apparatus and capable of providing colorless neutral displays in all directions and a liquid crystal display apparatus using the liquid crystal panel can be provided. Such an effect is significant in the case where the first birefringent layer arranged between the liquid crystal cell and the first polarizer arranged on one side of the liquid crystal cell has a relationship of $1<Nz\leqq 2$ where an Nz coefficient is defined by $Nz=(nx-nz)/(nx-ny)$; and the second birefringent layer arranged between the liquid crystal cell and the second polarizer arranged on another side of the liquid crystal cell has a refractive index profile of $nx=ny>nz$.

BRIEF DESCRIPTION OF THE DRAWINGS

In the accompanying drawings:

FIG. 11 is a graph showing black luminance measured in Example 2;

FIG. 12 is an xy chromaticity diagram showing color shift measured in Comparative Example 2;

DESCRIPTION OF THE PREFERRED EMBODIMENTS (Definitions of Terms and Symbols)

Definitions of terms and symbols in the specification of the present invention are described below.

(1) The symbol "nx" refers to a refractive index in a direction providing a maximum in-plane refractive index (that is, a slow axis direction), and the symbol "ny" refers to a refractive index in a direction perpendicular to the slow axis in the same plane (that is, a fast axis direction). The symbol "nz" refers to a refractive index in a thickness direction. Further, the expression "nx=ny", for example, not only refers to a case where nx and ny are exactly equal but also includes a case where nx and ny are substantially equal. In the specification of the present invention, the phrase "substantially equal" includes a case where nx and ny differ within a range providing no effects on overall polarization properties of an optical film in practical use.

(2) The term "in-plane retardation $\Delta nd$" refers to an in-plane retardation value of a film (layer) measured at 23° C. by using light of a wavelength of 590 nm. $\Delta nd$ can be determined from an equation $\Delta nd=(nx-ny)\times d$, where nx and ny represent refractive indices of a film (layer) at a wavelength of 590 nm in a slow axis direction and a fast axis direction, respectively, and d (nm) represents a thickness of the film (layer).

(3) The term "thickness direction retardation Rth" refers to a thickness direction retardation value measured at 23° C. by using light of a wavelength of 590 nm. Rth can be determined from an equation $Rth=(nx-nz)\times d$, where nx and nz represent refractive indices of a film (layer) at a wavelength of 590 nm in a slow axis direction and a thickness direction, respectively, and d (nm) represents a thickness of the film (layer).

(4) An Nz coefficient refers to a ratio of in-plane retardation $\Delta nd$ and thickness direction retardation Rth and is determined by an expression $Nz=(nx-nz)/(nx-ny)$.

Figure 1:
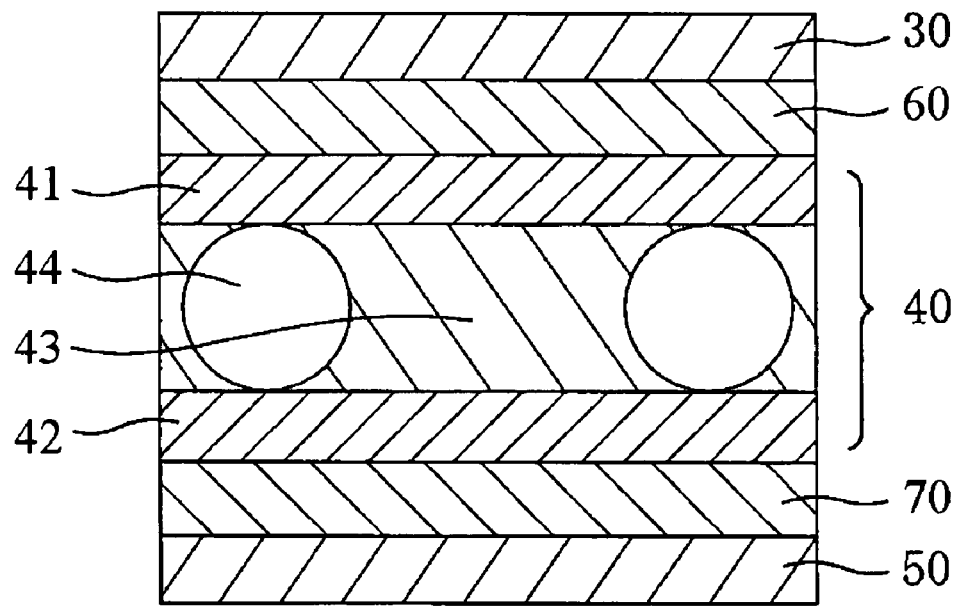
FIG. 1 is a schematic sectional view of a liquid crystal panel according to a preferred embodiment of the present invention.

A. Structure of Liquid Crystal Panel and Liquid Crystal Display Apparatus Including the Same FIG. 1 is a schematic sectional view illustrating a preferred example of a liquid crystal panel of the present invention. A liquid crystal panel 100 is provided with a first polarizer 30, a first birefringent layer 60, a liquid crystal cell 40, a second birefringent layer 70, and a second polarizer 50 in the order given. The first polarizer and the first birefringent layer may be arranged on a viewer side of the liquid crystal cell or arranged on a backlight side of the liquid crystal cell, but are preferably arranged on the viewer side. The first polarizer and the second polarizer may each have a protective layer on at least one side (not shown). In the liquid crystal panel of the present invention, lamination of the respective layers, the polarizers, and the liquid crystal cell is conducted through any appropriate pressure-sensitive layer or adhesive layer.

The first birefringent layer 60 refers to a birefringent layer having a relationship of 1<Nz<2 where an Nz coefficient is defined by $Nz=(nx-nz)/(nx-ny)$. The second birefringent layer 70 refers to a birefringent layer having a refractive index profile of nx=ny>nz. Details of the first birefringent layer 60 and the second birefringent layer 70 are described below.

An absorption axis of the first polarizer 30 and an absorption axis of the second polarizer 50 are preferably substantially perpendicular to each other.

The liquid crystal cell 40 includes: a pair of glass substrates 41 and 42; and a liquid crystal layer 43 as a display medium arranged between the substrates. One substrate (active matrix substrate) 41 is provided with: a switching element (typically, TFT) for controlling electrooptic properties of liquid crystals; and a scanning line for providing a gate signal to the switching element and a signal line for providing a source signal thereto (the lines not shown). The other glass substrate (color filter substrate) 42 is provided with a color filter (now shown). Note that the color filter may be provided in the active matrix substrate 41 as well. A distance (cell gap) between the substrates 41 and 42 is controlled by a spacer 44. An aligned film (not shown) formed of polyimide, for example, is provided on a side of each of the substrates 41 and 42 in contact with the liquid crystal layer 43.

Any appropriate drive mode can be employed for drive mode of the liquid crystal cell 40 as long as effects of the present invention can be obtained. Specific examples of the drive mode include STN (Super Twisted Nematic) mode, TN (Twisted Nematic) mode, IPS (In-Plane Switching) mode, VA (Vertical Aligned) mode, OCB (Optically Aligned Birefringence) mode, HAN (Hybrid Aligned Nematic) mode, and ASM (Axially Symmetric Aligned Microcell) mode. The VA mode and the OCB mode are preferred because of their remarkable improvements in color shifts.

Figure 2A:
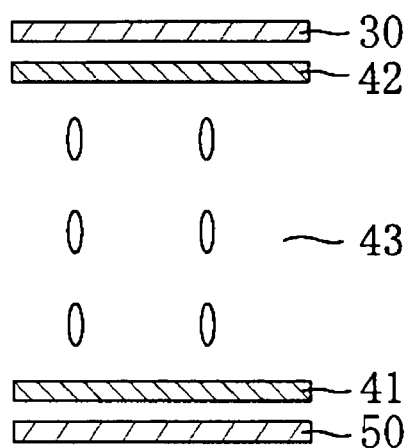
FIGS. 2A and 2B are each a schematic sectional view illustrating an alignment state of liquid crystal molecules of a liquid crystal layer in the case where a liquid crystal display apparatus of the present invention employs a liquid crystal cell of VA mode.
Figure 2B:
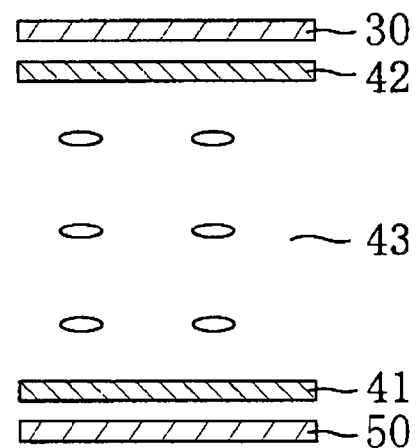

FIGS. 2A and 2B are each a schematic sectional view explaining an alignment state of liquid crystal molecules in VA mode. As shown in FIG. 2A, the liquid crystal molecules are aligned vertically to surfaces of the substrates 41 and 42 under no voltage application. Such vertical alignment may be realized by arranging nematic liquid crystals having negative dielectric anisotropy between substrates each having formed thereon a vertically aligned film (not shown). Light enters from a surface of one substrate 41 in such a state, and linear polarized light allowed to pass through the second polarizer 50 and to enter the liquid crystal layer 43 advances along long axes of vertically aligned liquid crystal molecules. No birefringence generates in a long axis direction of the liquid crystal molecules such that incident light advances without changing a polarization direction and is absorbed by the first polarizer 30 having a polarization axis perpendicular to the second polarizer 50. In this way, dark display is obtained under no voltage application (normally black mode). As shown in FIG. 2B, long axes of the liquid crystal molecules align parallel to the surfaces of the substrates under voltage application between electrodes. The liquid crystal molecules exhibit birefringence with respect to linear polarized light entering the liquid crystal layer 43 in such a state, and a polarization state of incident light varies depending on inclination of the liquid crystal molecules. Light allowed to pass through the liquid crystal layer under application, of a predetermined maximum voltage rotates its polarization direction by 90°, for example, into linear polarized light and passes through the first polarizer 30, to thereby provide light display. Return to a state under no voltage application provides dark display again by alignment control force. The inclination of the liquid crystal molecules is controlled by varying an application voltage. Therefore, an intensity of transmitted light from the first polarizer 30 may change, to thereby provide gradient display.

Figure 3A:
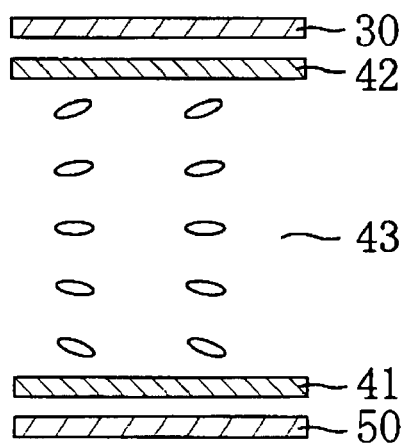
FIGS. 3A to 3D are each a schematic sectional view illustrating an alignment state of liquid crystal molecules of a liquid crystal layer in the case where a liquid crystal display apparatus of the present invention employs a liquid crystal cell of OCB mode.
Figure 3B:
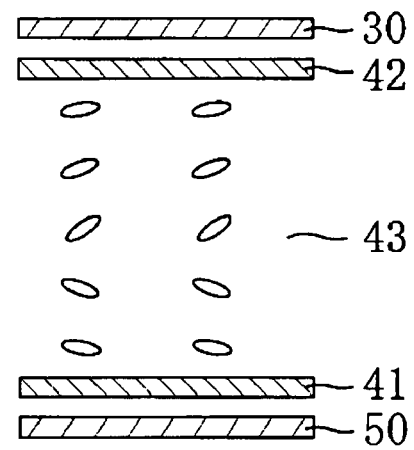
Figure 3C:
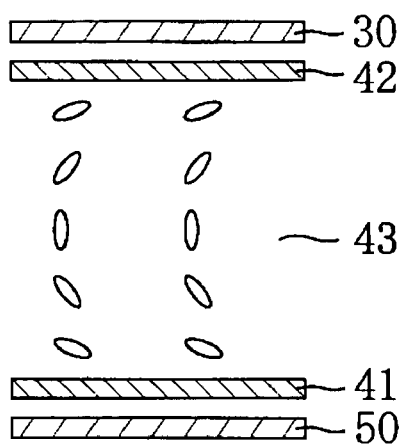
Figure 3D:
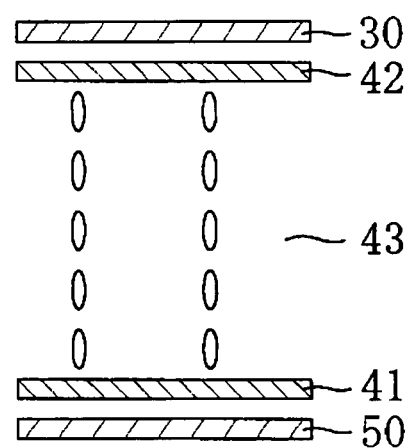

FIGS. 3A to 3D are each a schematic sectional view explaining an alignment state of liquid crystal molecules in OCB mode. The OCB mode refers to drive mode in which the liquid crystal layer 43 is formed of so-called bend alignment. As shown in FIG. 3C, the bend alignment refers to an alignment state in which: nematic liquid crystal molecules are aligned at a substantially parallel angle (alignment angle) in a vicinity of a substrate; the alignment angle forms a vertical angle with respect to a plane of the substrate toward the center of the liquid crystal layer; the alignment changes progressively and continuously to be parallel to the opposing substrate surface away from the center of the liquid crystal layer; and no twisted structure exists throughout the liquid crystal layer. Such bend alignment is formed as described below. As shown in FIG. 3A, the liquid crystal molecules have substantially homogenous alignment in a state in the absence of an electric field (initial state). However, the liquid crystal molecules each have a pretilt angle, and a pretilt angle in the vicinity of the substrate differs from a pretilt angle in the vicinity of the opposing substrate. Upon application of a predetermined bias voltage (typically, 1.5 V to 1.9 V) (under low voltage application), the liquid crystal molecules undergo a spray alignment as shown in FIG. 3B and transfer to a bend alignment as shown in FIG. 3C. Upon application of a display voltage (typically, 5 V to 7 V) (under high voltage application), the liquid crystal molecules in a bend alignment state align substantially vertically to the surface of the substrate as shown in FIG. 3D. In normally white display mode, light allowed to pass through the second polarizer 50 and to enter the liquid crystal layer in a state as shown in FIG. 3D under high voltage application advances without changing a polarization direction and is absorbed by the first polarizer 30, to thereby provide dark display. Reduction in display voltage returns the liquid crystal molecules into bend alignment by alignment control force of rubbing treatment, to thereby provide light display again. The inclination of the liquid crystal molecules is controlled by varying a display voltage. Therefore, an intensity of transmitted light from the polarizer may change, to thereby provide gradient display. A liquid crystal display apparatus provided with a liquid crystal cell of OCB mode allows very high speed switching of phase transfer from spray alignment state to bend alignment state, and thus has a characteristic of better movie display properties than those of a liquid crystal display apparatus provided with a liquid crystal cell of other drive mode such as TN mode or IPS mode.

The display mode of the liquid crystal cell of OCB mode may be: normally white mode which exhibits a dark state (black display) under high voltage application; or normally black mode which exhibits a bright state (white display) under high voltage application.

A cell gap of the liquid crystal cell of OCB mode is preferably 2 μm to 10 μm, more preferably 3 μm to 9 μm, and particularly preferably 4 μm to 8 μm. A cell gap within the above ranges can reduce a response time and provide favorable display properties.

The nematic liquid crystals to be used for the liquid crystal cell of OCB mode preferably have positive dielectric anisotropy. Specific examples of the nematic liquid crystals having positive dielectric anisotropy include those descried in JP 09-176645 A. Further, commercially available nematic liquid crystals may be used as they are. Examples of the commercially available nematic liquid crystals include "ZLI-4535" and "ZLI-1132" (tradename, manufactured by Merck Ltd., Japan). A difference between the ordinary index of refraction (no) and extraordinary index of refraction (ne) of the nematic liquid crystals, that is, a birefringence ($\Delta n_{LC}$) may appropriately be selected in accordance with response speed and transmittance of the liquid crystals, and the like. However, the birefringence is preferably 0.05 to 0.30, more preferably 0.10 to 0.30, and furthermore preferably 0.12 to 0.30. Such nematic liquid crystals each have a pretilt angle of preferably 1° to 10°, more preferably 2° to 8°, and particularly preferably 3° to 6°. A pretilt angle within above ranges can reduce response time and provide favorable display properties.

The liquid crystal panel as described above may suitably be used for a liquid crystal display apparatus such as a personal computer, a liquid crystal television, a cellular phone, a portable digital assistance (PDA), or a projector.

B. Polarizers

Any appropriate polarizer may be employed as the first polarizer and the second polarizer used in the present invention depending on the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based aligned film such as a dehydrated product of a polyvinyl alcohol-based film or a dehydrochlorinated product of a polyvinyl chloride-based film. Of those, a polarizer prepared by adsorbing a dichromatic substance such as iodine on a polyvinyl alcohol-based film and uniaxially stretching the film is particularly preferred because of its high polarized dichromaticity. A thickness of such a polarizer is generally, but not limited to, about 5 to 80 μm.

The polarizer prepared by adsorbing iodine on a polyvinyl alcohol-based film and uniaxially stretching the film maybe produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required. Washing the polyvinyl alcohol-based film with water not only allows removal of contamination on a film surface or washing away of an antiblocking agent, but also provides an effect of preventing unevenness such as uneven coloring by swelling of the polyvinyl alcohol-based film. The stretching of the film may be performed after coloring of the film with iodine, performed during coloring of the film, or performed followed by coloring of the film with iodine. The stretching may be performed in an aqueous solution of boric acid, potassium iodide, or the like, or in a water bath.

C. Protective Layer

The protective layer may employ any appropriate film which can be used as a protective layer of a polarizer. Specific examples of a material to be included as a main component of the film include: a cellulose-based resin such as triacetyl cellulose (TAC); and a transparent resin such as a polyester-based resin, a polyvinyl alcohol-based resin, a polycarbonate-based resin, a polyamide-based resin, a polyimide-based resin, a polyethersulfone-based resin, a polysulfone-based resin, a polystyrene-based resin, a polynorbornene-based resin, a polyolefin-based resin, an acrylic resin, or an acetate-based resin. Other examples thereof include: a thermosetting resin such as an acrylic resin, an urethane-based resin, an acrylurethane-based resin, an epoxy-based resin, or a silicone-based resin; and a UV-curable resin. Still another example thereof is a glassy polymer such as a siloxane-based polymer. Further, a polymer film described in JP 2001-343529 A (WO 01/37007) may also be used. A material for the film may employ a resin composition containing a thermoplastic resin having a substituted or unsubstituted imide group on a side chain, and a thermoplastic resin having a substituted or unsubstituted phenyl group and nitrile group on a side chain, for example. A specific example thereof is a resin composition containing an alternating isobutene/N-methyl-maleimide copolymer, and an acrylonitrile/styrene copolymer. The polymer film may be an extrusion molded product of the resin composition described above, for example. TAC, a polyimide-based resin, a polyvinyl alcohol-based resin, and a glassy polymer are preferred. The protective layers may be the same or different from each other.

It is preferable that the protective layer be transparent and have no color. Specifically, the protective layer has a thickness direction retardation of preferably −90 nm to +90 nm, more preferably −80 nm to +80 nm, and most preferably −70 nm to +70 nm.

The protective layer has any appropriate thickness as long as the preferable thickness direction retardation can be obtained. Specifically, the thickness of the protective layer is preferably 5 mm or less, more preferably 1 mm or less, particularly preferably 1 to 500 µm, and most preferably 5 to 150 µm.

D. First Birefringent Layer

The first birefringent layer has a relationship of $1 < Nz \leq 2$ where an Nz coefficient is defined by $Nz=(nx-nz)/(nx-ny)$. The first birefringent layer has a relationship of preferably $1.1 \leq Nz \leq 1.7$, and more preferably $1.1 \leq Nz \leq 1.4$. The first birefringent layer having a relationship of $1 < Nz \leq 2$ is used in combination with a specific second birefringent layer, and thus a liquid crystal panel suitable for a liquid crystal display apparatus and capable of providing colorless neutral displays in all directions can be provided.

An in-plane retardation of the first birefringent layer is preferably 90 to 160 nm, more preferably 95 to 150 nm, and still more preferably 95 to 145 nm.

A thickness of the first birefringent layer can be set to provide a desired in-plane retardation. Specifically, the thickness of the first birefringent layer is preferably 20 to 110 µm, more preferably 25 to 105 µm, and most preferably 30 to 100 µm.

Typical examples of a resin capable of forming the first birefringent layer include a cyclic olefin-based resin and a cellulose-based resin. Specifically, the first birefringent layer is preferably formed of a cyclic olefin-based film or a cellulose-based film.

The cyclic olefin-based resin is a general term for a polymerized resin of a cyclic olefin as a polymerization unit, and examples thereof include resins described in JP 1-240517 A, JP 3-14882 A, JP 3-122137 A, and the like. Specific examples thereof include a ring-opened (co)polymer of a cyclic olefin, an addition polymer of a cyclic olefin, a copolymer (typically, a random copolymer) of a cyclic olefin and an α-olefin such as ethylene or propylene, a graft modified product containing those polymers modified with an unsaturated carboxylic acid or a derivative thereof, and hydrides thereof. A specific example of the cyclic olefin is a norbornene-based monomer.

Examples of the norbornene-based monomer include: norbornene, and an alkyl and/or alkylidene substitute such as 5-methyl-2-norbornene, 5-dimethyl-2-norbornene, 5-ethyl-2-norbornene, 5-butyl-2-norbornene, 5-ethylidene-2-norbornene, or a derivative thereof substituted by a polar group such as a halogen; dicyclopentadiene, 2,3-dihydrodicyclopentadiene, or the like; dimethanooctahydronaphthalene, a derivative thereof substituted by alkyl and/or alkylidene, and a derivative thereof substituted by a polar group such as a halogen, such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethyliden-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, or 6-methoxycarbonyl-1,4:5,8-dimethano-1,4,4a,5,6,7,8,8a-octahydronaphthalene; and a trimer or tetramer of cyclopentadiene such as 4,9:5,8-dimethano-3a,4,4a,5,8,8a,9,9a-octahydro-1H-benzoindene, or 4,11:5,10:6,9-trimethano-3a,4,4a,5,5a,6,9,9a,10,10a,11,11a-dodecahydro-1H-cyclopentaanthracene.

In the present invention, other cycloolefins which may be subjected to ring opening polymerization may be used in combination within a range not inhibiting the effect of the present invention. A specific example of such a cycloolefin is a compound having one reactive double bond such as cyclopentene, cyclooctene, or 5,6-dihydrodicyclopentadiene.

The cyclic olefin-based resin has a number average molecular weight (Mn) preferably 25,000 to 200,000, more preferably 30,000 to 100,000, and most preferably 40,000 to 80,000 measured through a gel permeation chromatography (GPC) method by using a toluene solvent of. A number average molecular weight within the above ranges can provide excellent mechanical strength, and favorable solubility, forming property, and casting operability.

In the case where the cyclic olefin-based resin is prepared through hydrogenation of a ring opened polymer of a norbornene-based monomer, a hydrogenation rate is preferably 90% or more, more preferably 95% or more, and most preferably 99% or more. A hydrogenation rate within the above ranges can provide excellent heat degradation resistance and light degradation resistance.

Various products of the cyclic olefin-based resin are commercially available. Specific examples thereof include: "ZEONEX" and "ZEONOR", trade names, available from Zeon Corporation; "Arton", trade name, available from JSR Corporation; "Topas", trade name, available from Ticona; and "APEL", trade name, available from Mitsui Chemical Corporation.

The first birefringent layer may be obtained by stretching a film formed of the cyclic olefin-based resin (cyclic olefin-based film). A method of forming the cyclic olefin-based film may employ any appropriate fabrication method. Specific examples thereof include a compression molding method, a transfer molding method, an injection molding method, an extrusion molding method, a blow molding method, a powder molding method, an FRP molding method, and a casting method. An extrusion molding method or a casting method is preferred because a film to be obtained has enhanced smoothness and favorable optical uniformity. Molding conditions may appropriately be set in accordance with the composition or kind of resin to be used, properties desired for the first birefringent layer, and the like. Note that numerous film products of the cyclic olefin-based film are commercially available, and thus a commercially available film as it is may be subjected to stretching treatment.

The cyclic olefin-based film may be free-end stretched film or a fixed-end stretched film. The cyclic olefin-based film is preferably a fixed-end stretched film. Fixed-end stretching easily forms a film having an Nz coefficient relationship of $1<Nz\leqq2$. Further, fixed-end stretching can provide a slow axis in a lateral direction (width direction) of the film. Thus, in the case where a slow axis of the film is arranged to be perpendicular to an absorption axis of a polarizer, attachment of the film and the polarizer may be conducted continuously by roll to roll, to thereby increase production efficiency.

A stretching ratio of the cyclic olefin-based resin film is preferably 1.2 to 4.0 times, more preferably 1.2 to 3.8 times, and most preferably 1.25 to 3.6 times. Stretching at such a stretching ratio may provide a first birefringent layer capable of appropriately exerting effects of the present invention. In the case where the stretching ratio is less than 1.2 times, desired in-plane retardation required for the first birefringent layer may not be developed. In the case where the stretching ratio is more than 4.0 times, the film may break or become brittle during stretching.

A stretching temperature of the cyclic olefin-based resin is preferably 130 to 165° C., more preferably 135 to 165° C., and most preferably 137 to 165° C. Stretching at such a temperature may provide a first birefringent layer capable of appropriately exerting the effects of the present invention. In the case where the stretching temperature is lower than 130° C., uniform stretching may not be realized. In the case where the stretching temperature is higher than 165° C., desired in-plane retardation required for the first birefringent layer may not be developed.

The cellulose-based resin may employ any appropriate cellulose-based resin (typically, an ester of a cellulose and an acid).

The cellulose-based resin is preferably substituted by an acetyl group and a propionyl group. A lower limit of a degree of substitution of the cellulose-based resin "DSac (degree of acetyl substitution)+DSpr (degree of propionyl substitution)" (indicating how many of three hydroxyl groups present in a repeating unit of a cellulose is substituted by an acetyl group or a propionyl group on average) is preferably 2 or more, more preferably 2.3 or more, and furthermore preferably 2.6 or more. An upper limit of "DSac +DSpr" is preferably 3 or less, more preferably 2.9 or less, and furthermore preferably 2.8 or less. The degree of substitution of the cellulose-based resin is adjusted within the above ranges, to thereby provide a first birefringent layer having a desired refractive index profile.

A lower limit of DSpr (degree of propionyl substitution) is preferably 1 or more, more preferably 2 or more, and furthermore preferably 2.5 or more. An upper limit of DSpr is preferably 3 or less, more preferably 2.9 or less, and furthermore preferably 2.8 or less. DSpr is adjusted within the above ranges, to thereby provide a first birefringent layer capable of appropriately exerting the effects of the present invention.

DSac (degree of acetyl substitution) and DSpr (degree of propionyl substitution) can be determined by a method described in paragraphs [0016] to [0019] of JP 2003-315538 A.

The cellulose-based resin may have another substituent excluding the acetyl group and the propionyl group. Examples of the other substituent include: an ester group such as a butyrate group; and an ether group such as an alkyl ether group or an aralkylene ether group.

A number average molecular weight of the cellulose-based resin is preferably 5,000 to 100,000, and more preferably 10,000 to 70,000. The number average molecular weight thereof is adjusted within the above ranges, to thereby provide excellent productivity and favorable mechanical strength.

A method of substituting by the acetyl group and propionyl group may employ any appropriate method. For example, a cellulose may be treated with a strong caustic soda solution to prepare an alkali cellulose, and the alkali cellulose and a predetermined amount of a mixture of acetic anhydride and propionic anhydride are mixed for acylation. An acyl group is partly hydrolyzed for adjusting the degree of substitution "DSac+DSpr".

The cellulose-based film may contain any appropriate polymer material. Examples of such a polymer material include: a cellulose ester such as cellulose butyrate; and a cellulose ether such as methyl cellulose or ethyl cellulose. The cellulose-based film may contain additives such as a plasticizer, a heat stabilizer, and a UV stabilizer as required.

The first birefringent layer may be obtained by stretching a film formed of the cellulose-based resin (cellulose-based film). A method of forming the film from the cellulose-based resin may employ any appropriate fabrication method. Specific examples thereof include a compression molding method, a transfer molding method, an injection molding method, an extrusion molding method, a blow molding method, a powder molding method, an FRP molding method, and a casting method. An extrusion molding method or a casting method is preferred because a film to be obtained has enhanced smoothness and favorable optical uniformity. Molding conditions may appropriately be set in accordance with the composition or kind of resin to be used, properties desired for the first birefringent layer, and the like. Note that numerous film products of the cellulose-based film are commercially available, and thus a commercially available film as it is may be subjected to stretching treatment.

The stretching of the cellulose-based resin film preferably employs sequential stretching involving free-end stretching in an MD direction and then free-end stretching in a TD direction. The sequential stretching is conducted, and thus the effects of the present invention may appropriately be exerted.

Preferred conditions of the sequential stretching include: free-end stretching in an MD direction at a stretching temperature of 120 to 160° C. and a stretching ratio at 1.2 to 2.0 times; and free-end stretching in a TD direction at a stretching temperature of 120 to 160° C. and a stretching ratio of 1.01 to 1.05 times. Such stretching conditions are employed, and thus the effects of the present invention may appropriately be exerted.

In the sequential stretching, the free-end stretching in an MD direction is more preferably conducted at a stretching temperature of 125 to 155° C. and a stretching ratio of 1.2 to 1.9 times, and furthermore preferably conducted at a stretching temperature of 130 to 150° C. and a stretching ratio of 1.3 to 1.8 times.

In the sequential stretching, the free-end stretching in a TD direction is more preferably conducted at a stretching temperature of 125 to 155° C. and a stretching ratio of 1.01 to 1.05 times, and furthermore preferably conducted at a stretching temperature of 130 to 150° C. and a stretching ratio of 1.01 to 1.05 times.

E. Lamination of First Birefringent Layer and First Polarizer

In the optical film of the present invention, a polarizer (first polarizer) and a birefringent layer (first birefringent layer) are laminated directly through a pressure-sensitive adhesive or an adhesive. As shown in FIG. 1 as an example, the first polarizer 30 and the first birefringent layer 60 are laminated directly through a pressure-sensitive adhesive or an adhesive.

A surface of the first birefringent layer to be laminated to the first polarizer is preferably subjected to easily adhesive treatment. The easily adhesive treatment is preferably performed by applying a resin material. Examples of the resin material include a silicon-based resin, a urethane-based resin, and an acrylic resin. An easily adhesive layer is formed through the easily adhesive treatment. The easily adhesive layer has a thickness of preferably 5 to 100 nm, and more preferably 10 to 80 nm.

The first polarizer is laminated directly on the first birefringent layer through a pressure-sensitive adhesive or an adhesive. In the case where the first birefringent layer is subjected to easily adhesive treatment, a surface of the first birefringent layer subjected to the easily adhesive treatment is laminated directly on the first polarizer through a pressure-sensitive adhesive or an adhesive. The pressure-sensitive adhesive forms a pressure-sensitive adhesive layer, and the adhesive forms an adhesive layer. The pressure-sensitive adhesive or the adhesive may be applied to the first polarizer, to the first birefringent layer, or to both the first polarizer and the first birefringent layer.

The thickness of the pressure-sensitive adhesive layer may appropriately be set in accordance with the intended use or adhesive strength. To be specific, the pressure-sensitive adhesive layer has a thickness of preferably 1 µm to 100 µm, more preferably 3 µm to 50 µm, still more preferably 5 µm to 30 µm, and most preferably 10 µm to 25 µm.

Any appropriate pressure-sensitive adhesive may be employed as the pressure-sensitive adhesive forming the pressure-sensitive adhesive layer. Specific examples thereof include a solvent-type pressure-sensitive adhesive, a non-aqueous emulsion-type pressure-sensitive adhesive, an aqueous pressure-sensitive adhesive, and a hot-melt pressure-sensitive adhesive. A solvent-type pressure-sensitive adhesive containing an acrylic polymer as a base polymer is preferably used for exhibiting appropriate pressure-sensitive adhesive properties (wetness, cohesiveness, and adhesive property) with respect to the first polarizer and the first birefringent layer and providing excellent optical transparency, weatherability, and heat resistance.

The adhesive layer is formed by applying and drying an application solution containing an adhesive in a predetermined amount to a surface of the first birefringent layer and/or a surface of the first polarizer, for example. Any appropriate method may be employed as a method of preparing the application solution. For example, a commercially available solution or dispersion may be used, or a solvent may be added to the commercially available solution or dispersion and used. Alternatively, a solid content may be dissolved or dispersed in various solvents and then used.

Any adhesive having appropriate properties, form, and adhesion mechanism may be used as the adhesive depending on the purpose. Specific examples thereof include an aqueous adhesive, a solvent-type adhesive, an emulsion-type adhesive, a latex type adhesive, a mastic adhesive, a multi-layer adhesive, a paste adhesive, a foamed adhesive, and a supported-film adhesive; a thermoplastic adhesive, a heat-melting adhesive, a thermocoagulation resin, a hot-melt resin, a heat-activated resin, an adhesive for heat-sealing, a thermosetting adhesive, a contact adhesive, a pressure-sensitive adhesive, a polymerized adhesive, a solvent-type adhesive, and a solvent-activated adhesive. Of those, in the present invention, an aqueous adhesive which has excellent transparency, adhesive property, workability, and quality of a product, and is excellent in economic term is preferably used.

The aqueous adhesive contains a water-soluble natural polymer and/or synthetic polymer as the main component(s). Specific examples of the natural polymer include proteins and starch. Specific examples of the synthetic polymer include a resole resin, a urea resin, a melamine resin, polyvinyl alcohol, polyethylene oxide, polyacrylamide, polyvinyl pyrrolidone, an acrylate, and a methacrylate.

Of the water-soluble adhesives, an adhesive containing as a main component a polyvinyl alcohol-based resin is preferably used in the present invention, and an adhesive containing as a main component modified polyvinyl alcohol having an acetoacetyl group (polyvinyl alcohol-based resin having an acetoacetyl group) is more preferably used because of extremely excellent adhesiveness to the first polarizer and extremely excellent adhesiveness to the first birefringent layer. Specific examples of the above-mentioned polyvinyl alcohol-based resin having an acetoacetyl group include: "GOHSENOL Z series" (trade name, available from Nippon Synthetic Chemical Industry Co., Ltd.); "GOHSENOL NH series" (trade name, available from Nippon Synthetic Chemical Industry Co., Ltd.); and "GOHSEFIMER Z series" (trade name, available from Nippon Synthetic Chemical Industry Co., Ltd.).

Examples of the above-mentioned polyvinyl alcohol-based resin include: a saponified product obtained by saponifying polyvinyl acetate; derivatives thereof; a saponified product of a copolymer obtained by copolymerizing vinyl acetate with a monomer having copolymerizability with vinyl acetate; and a modified polyvinyl alcohol obtained by modifying polyvinyl alcohol to acetal, urethane, ether, graft, phosphate, or the like. Examples of the monomer include: unsaturated carboxylic acids such as maleic anhydrides or maleic acid, fumaric acid, crotonic acid, itaconic acid, and (meth) acrylic acid and esters thereof; α-orefin such as ethylene and propylene; (sodium) (meth)allylsulfonate; sodium sulfonate (monoalkylmalate); sodium disulfonate alkylmalate; N-methylol acrylamide; alkali salts of acrylamide alkylsulfonate; N-vinylpyrrolidone; and derivatives of N-vinylpyrrolidone. The resins may be used alone or two or more of them may be used in combination.

The polyvinyl alcohol-based resin has an average degree of polymerization of preferably approximately 100 to 5,000, and more preferably 1,000 to 4,000, and an average degree of saponification of preferably approximately 85 to 100 mol %, and more preferably 90 to 100 mol % from a viewpoint of adhesiveness.

The polyvinyl alcohol-based resin having an acetoacetyl group may be obtained through a reaction of a polyvinyl alcohol-based resin and a diketene by any appropriate method, for example. Specific examples thereof include: a method of adding a diketene to a dispersion containing a polyvinyl alcohol-based resin dispersed in a solvent such as acetic acid; a method of adding a diketene to a solution containing a polyvinyl alcohol-based resin dissolved in a solvent such as dimethyl formamide or dioxane; and a method of subjecting a diketene gas or a liquid diketene to direct contact with a polyvinyl alcohol-based resin.

A degree of acetoacetyl modification of the polyvinyl alcohol-based resin having an acetoacetyl group is representatively 0.1 mol % or more, preferably approximately 0.1 to 40 mol %, more preferably 1 to 20 mol %, and particularly preferably 2 to 7 mol %. There is a risk that a degree of acetoacetyl modification of less than 0.1 mol % provides insufficient water resistance. A degree of acetoacetyl modification of more than 40 mol % provides a small effect of improving the water resistance. It should be noted that the degree of acetoacetyl modification is a value measured by NMR.

The water-soluble adhesive containing as a main component a polyvinyl alcohol-based resin may preferably further contain a crosslinking agent to further improve water resistance. The crosslinking agent may employ any appropriate crosslinking agent. A compound having at least two functional groups each having reactivity with the polyvinyl alcohol-based resin can be used as the crosslinking agent. Examples of the compound include: alkylene diamines having an alkylene group and two amino groups such as ethylene diamine, triethylene diamine, and hexamethylene dimamine; isocyanates such as tolylene diisocyanate, hydrogenated tolylene diisocyanate, a trimethylol propane tolylene diisocyanate adduct, triphenylmethane triisocyanate, methylene bis(4-phenylmethane)triisocyanate, isophorone diisocyanate, and ketoxime blocked compounds and phenol blocked compounds thereof; epoxies such as ethylene glycol diglycidyl ether, polyethylene glycol diglycidyl ether, glycerin di- or triglycidyl ether, 1,6-hexane diol diglycidyl ether, trimethylol propane triglycidyl ether, diglycidyl aniline, and diglycidyl amine; monoaldehydes such as formaldehyde, acetaldehyde, propione aldehyde, and butyl aldehyde; dialdehydes such as glyoxal, malondialdehyde, succinedialdehyde, glutardialdehyde, maleic dialdehyde, and phthaldialdehyde; an amino/formaldehyde resin such as a condensate of formaldehyde with methylolurea; methylolmelamine, alkylated methylolurea, alkylated methylol melamine, acetoguanamine, or benzoguanamine; and salts of divalent metals or trivalent metals such as sodium, potassium, magnesium, calcium, aluminum, iron, and nickel and oxides thereof. Of those, an amino/formaldehyde resin and dialdehydes are preferred. A compound having a methylol group is preferred as an amino/formaldehyde resin, and glyoxal is preferred as dialdehydes. Of those, a compound having a methylol group is preferred, and methylol melamine is particularly preferred. Specific examples of the aldehyde compound include: "Glyoxal" (trade name, available from Nippon Synthetic Chemical Industry Co., Ltd.); and "Sequarez 755" (trade name, available from OMNOVA Solutions Inc.). A specific example of the amine compound is "m-Xylenediamine" (trade name, available from Mitsubishi Gas Chemical Company, Inc.). A specific example of the methylol compound is "WATERSOL series" (trade name, available from Dainippon Ink and Chemicals, Incorporated).

A mixing amount of the crosslinking agent is preferably 1 to 60 parts by weight with respect to 100 parts by weight of polyvinyl alcohol (preferably a polyvinyl alcohol-based resin having an acetoacetyl group). An upper limit of the mixing amount is more preferably 50 parts by weight, furthermore preferably 30 parts by weight, and still furthermore preferably 15 parts by weight, particularly preferably 10 parts by weight, and most preferably 7 parts by weight. A lower limit of the mixing amount is more preferably 5 parts by weight, furthermore preferably 10 parts by weight, and particularly preferably 20 parts by weight. The mixing amount is adjusted within the above ranges, to thereby form an adhesive layer having excellent transparency, adhesive property, and water resistance. Note that in the case where the mixing amount of the crosslinking agent is large, a reaction of the crosslinking agent proceeds in a short period of time and the adhesive tends to undergo gelling. As a result, a pot life of the adhesive is significantly reduced, and industrial use may involve difficulties. However, in the case where a metal compound colloid is used in combination as described below, the crosslinking agent in a large mixing amount may be used stably.

A water-soluble adhesive containing as a main component the polyvinyl alcohol-based resin may further contain a metal compound colloid. The metal compound colloid may contain metal compound fine particles dispersed in a dispersion medium and may be realize electrostatic stabilization based on mutual repulsion of like charges of the fine particles and may have permanent stability. An average particle size of the fine particles forming the metal compound colloid may be any appropriate value without providing adverse effects on optical properties such as polarization properties. The average particle size thereof is preferably 1 to 100 nm, and more preferably 1 to 50 nm for uniformly dispersing the fine particles in the adhesive layer, assuring adhesive property, and suppressing knicks. Note that the term "knicks" refers to local uneven defects formed at an interface between the polarizer and the protective layer.

The metal compound may employ any appropriate compound. Examples thereof include: a metal oxide such as alumina, silica, zirconia, or titania; a metal salt such as aluminum silicate, calcium carbonate, magnesium silicate, zinc carbonate, barium carbonate, or calcium phosphate; and a mineral such as celite, talc, clay, or kaolin. Alumina is preferred.

The metal compound colloid is typically dispersed in a dispersion medium and present in a state of a colloidal solution. Examples of the dispersion medium include water and alcohols. A solid content in the colloidal solution is typically about 1 to 50 wt %. The colloidal solution may contain as a stabilizer an acid such as nitric acid, hydrochloric acid, or acetic acid.

The mixing amount of the metal compound colloid (solid content) is preferably 200 parts by weight or less, more preferably 10 to 200 parts by weight, furthermore preferably 20 to 175 parts by weight, and most preferably 30 to 150 parts by weight with respect to 100 parts by weight of the polyvinyl alcohol-based resin for assuring adhesive property and suppressing formation of knicks.

A method of preparing the adhesive may employ any appropriate method. For example, in the case where the adhesive contains a metal compound colloid, an example of the method is a method of mixing a metal compound colloid into a mixture of a polyvinyl alcohol and a crosslinking agent mixed in advance to an appropriate concentration. Alternatively, a polyvinyl alcohol-based resin and a metal compound colloid may be mixed, and then a crosslinking agent may be mixed thereinto in consideration of use timing and the like. Note that a concentration of a resin solution may be adjusted after preparation of the resin solution.

A resin concentration of the adhesive is preferably 0.1 to 15 wt %, and more preferably 0.5 to 10 wt % from the viewpoints of applicability, shelf stability, and the like.

A pH of the adhesive is preferably 2 to 6, more preferably 2.5 to 5, furthermore preferably 3 to 5, and most preferably 3.5 to 4.5. In general, a surface charge of the metal compound colloid may be controlled by adjusting the pH. The surface charge is preferably a positive charge. The metal compound colloid has a positive charge, and thus formation of knicks may be suppressed, for example.

A concentration of the total solid content in the adhesive may vary depending on the solubility, application viscosity, wetting property, intended thickness, and the like of the adhesive. The concentration of the total solid content is preferably 2 to 100 (weight ratio), more preferably 10 to 50 (weight ratio), and most preferably 20 to 40 (weight ratio) with respect to 100 of a solvent. A concentration of the total solid content in the adhesive within the above ranges can provide an adhesive layer having a highly even surface.

A viscosity of the adhesive is not particularly limited, but is preferably 1 to 50 (mPa·s), more preferably 2 to 30 (mPa·s), and most preferably 4 to 20 (mPa·s) measured at 23° C. and a shear rate of 1,000 (1/s). A viscosity of the adhesive within the above ranges allows formation of an adhesive layer having excellent surface evenness.

Any appropriate method may be employed as a method of applying the adhesive, and an example thereof is an application method using a coater. A coater to be used may be arbitrarily selected from the above-described coaters.

A glass transition temperature (Tg) of the adhesive is not particularly limited, but is preferably 20 to 120° C., more preferably 40 to 100° C., and most preferably 50 to 90° C. The glass transition temperature can be determined through a method in accordance with JIS K7121-1987 by differential scanning calorimetry (DSC) measurement.

A thickness of the adhesive layer is not particularly limited, but is preferably 0.01 to 0.15 μm, more preferably 0.02 to 0.12 μm, and most preferably 0.03 to 0.09 μm. A thickness of the adhesive layer within the above ranges can provide a polarizing plate having excellent durability causing no peeling or floating of the polarizer even when the polarizing plate of the present invention is exposed to high temperature and high humidity environment.

The adhesive may contain a coupling agent such as a silane coupling agent or a titanium coupling agent, various tackifiers, an UV absorber, an antioxidant, a stabilizer such as a heat resistant stabilizer or a hydrolysis resistant stabilizer, and the like.

F. Second Birefringent Layer

The second birefringent layer has a relationship of nx=ny>nz. The second birefringent layer may be a monolayer or a laminate of two or more layers. In the laminate, the material used for forming each layer and the thickness of each layer may appropriately be set as long as the laminate as a whole has optical properties as described above.

In the case where the second birefringent layer has a relationship of nx=ny>nz, the second birefringent layer may serve as a so-called negative C plate. The second birefringent layer having such a refractive index profile may be used in combination with a specific first birefringent layer, and thus the effects of the present invention may effectively be attained. As described above, in the specification of the present invention, the expression "nx=ny" not only refers to the case where nx and ny are exactly equal but also includes the case where nx and ny are substantially equal. Thus, the second birefringent layer may have in-plane retardation and may have a slow axis. An allowable in-plane retardation Δnd of the second birefringent layer as a negative C plate for practical use is preferably 0 to 20 nm, more preferably 0 to 10 nm, and furthermore preferably 0 to 5 nm.

A thickness direction retardation Rth of the second birefringent layer is preferably 30 to 350 nm, more preferably 60 to 300 nm, furthermore preferably 80 to 260 nm, and most preferably 100 to 240 nm.

The thickness of the second birefringent layer having such a thickness direction retardation may vary depending on the kind of materials to be used and the like. For example, the thickness of the second birefringent layer is preferably 1 to 50 μm, more preferably 1 to 20 μm, furthermore preferably 1 to 15 μm, still furthermore preferably 1 to 10 μm, particularly preferably 1 to 8 μm, and most preferably 1 to 5 μm. Such a thickness is smaller than a thickness (60 μm or more, for example) of a negative C plate obtained through biaxial stretching and may significantly contribute to reduction in thickness of an image display apparatus. Further, the second birefringent layer may be formed to be extremely thin, to thereby significantly prevent uneven heating.

A material used for forming the second birefringent layer may employ any appropriate material as long as the optical properties as described above can be obtained. Preferably, the second birefringent layer is a coated layer of a non-liquid crystalline material because the thickness thereof can be remarkably reduced compared with a thickness of a stretched film and may contribute to reduction in thickness of a liquid crystal panel. Preferably, the non-liquid crystalline material is a non-liquid crystalline polymer. In the case where such a non-liquid crystalline material is used for a coated layer, the non-liquid crystalline material differs from a liquid crystalline material and may form a film having optical uniaxial property of nx>nz and ny>nz due to its property regardless of alignment property of a substrate. As a result, not only an aligned substrate but also a non-aligned substrate may be used. Further, even in the case where a non-aligned substrate is used, a step of applying an aligned film to its surface, laminating an aligned film thereon, or the like may be omitted.

Examples of the non-liquid crystalline material include polymers described in paragraphs (0018) to (0072) of JP 2004-46065 such as a polyamide, a polyimide, a polyester, a polyether ketone, a polyamideimide, and a polyestermide because those polymers have excellent heat resistance, chemical resistance, and transparency, and high rigidity. One kind of polymer may be used alone, or the polymers may be used as a mixture of two or more kinds of polymers having different functional groups such as a mixture of polyarylether ketone and polyamide, for example. Of the polymers, a polyimide is particularly preferred because of high transparency, high alignment property, and high stretching property.

A molecular weight of the polymer is not particularly limited. However, the polymer has a weight average molecular weight (Mw) of preferably within a range of 1,000 to 1,000,000, more preferably within a range of 2,000 to 500,000, for example.

Polyimide which has high in-plane alignment ability and which is soluble in an organic solvent is preferred as polyimide used in the present invention, for example. More specifically, a polymer disclosed in JP 2000-511296 A, containing a condensation polymerization product of 9,9-bis(aminoaryl) fluorene and aromatic tetracarboxylic dianhydride, and containing at least one repeating unit represented by the following formula (1) can be used.

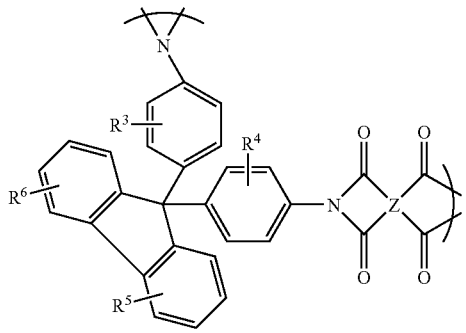

(1)

In the above formula (1), $R^3$ to $R^6$ independently represent at least one type of substituent selected from hydrogen, a halogen, a phenyl group, a phenyl group substituted with 1 to 4 halogen atoms or 1 to 4 alkyl groups each having 1 to 10 carbon atoms, and an alkyl group having 1 to 10 carbon atoms. Preferably, $R^3$ to $R^6$ independently represent at least one type of substituent selected from a halogen, a phenyl group, a phenyl group substituted with 1 to 4 halogen atoms or 1 to 4 alkyl groups each having 1 to 10 carbon atoms, and an alkyl group having 1 to 10 carbon atoms.

In the above formula (1), Z represents a tetravalent aromatic group having 6 to 20 carbon atoms, and preferably represents a pyromellitic group, a polycyclic aromatic group, a derivative of the polycyclic aromatic group, or a group represented by the following formula (2), for example.

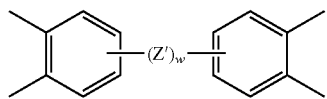

(2)

In the above formula (2), Z' represents a covalent bond, a $C(R^7)_2$ group, a CO group, an O atom, an S atom, an $SO_2$ group, an $Si(C_2H_5)_2$ group, or an $NR^8$ group. A plurality of Z's may be the same or different from each other. w represents an integer of 1 to 10. $R^7$s independently represent hydrogen or a $C(R^9)_3$ group. $R^8$ represents hydrogen, an alkyl group having 1 to about 20 carbon atoms, or an aryl group having 6 to 20 carbon atoms. A plurality of $R^8$s may be the same or different from each other. $R^9$s independently represent hydrogen, fluorine, or chlorine.

An example of the polycyclic aromatic group includes a tetravalent group derived from naphthalene, fluorene, benzofluorene, or anthracene. An example of the substituted derivative of the polycyclic aromatic group includes the above polycyclic aromatic group substituted with at least a group selected from an alkyl group having 1 to 10 carbon atoms, a fluorinated derivative thereof, and a halogen such as F or Cl.

Other examples of the polyimide include: a homopolymer disclosed in JP 08-511812 A and containing a repeating unit represented by the following general formula (3) or (4); and polyimide disclosed therein and containing a repeating unit represented by the following general formula (5). Note that, polyimide represented by the following formula (5) is a preferred form of the homopolymer represented by the following formula (3).

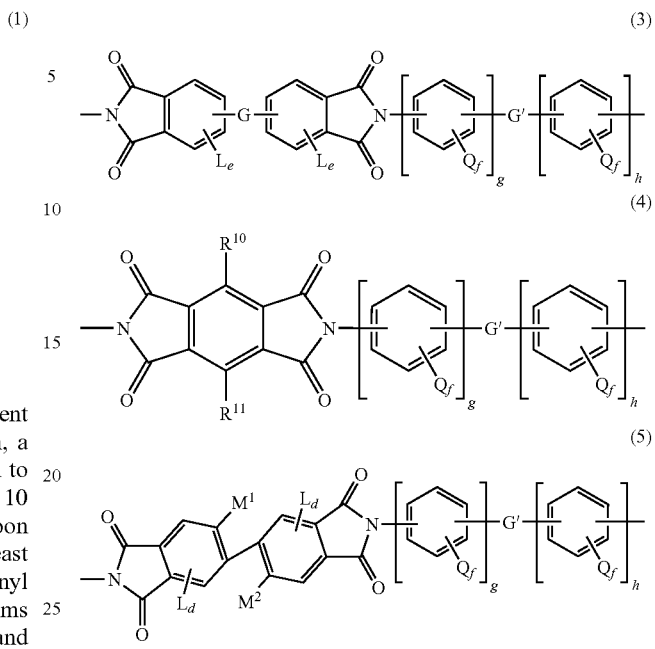

In the above general formulae (3) to (5), G and G' independently represent a covalent bond, a $CH_2$ group, a $C(CH_3)_2$ group, a $C(CF_3)_2$ group, a $C(CX_3)_2$ group (wherein, X represents a halogen), a CO group, an O atom, an S atom, an $SO_2$ group, an $Si(CH_2CH_3)_2$ group, or an $N(CH_3)$ group, for example. G and G' may be the same or different from each other.

In the above formulae (3) and (5), L is a substituent, and d and e each represent the number of the substituents. L represents a halogen, an alkyl group having 1 to 3 carbon atoms, a halogenated alkyl group having 1 to 3 carbon atoms, a phenyl group, or a substituted phenyl group, for example. A plurality of Ls may be the same or different from each other. An example of the substituted phenyl group includes a substituted phenyl group having at least one type of substituent selected from a halogen, an alkyl group having 1 to 3 carbon atoms, and a halogenated alkyl group having 1 to 3 carbon atoms, for example. Examples of the halogen include fluorine, chlorine, bromine, and iodine. d represents an integer of 0 to 2, and e represents an integer of 0 to 3.

In the above formulae (3) to (5), Q is a substituent, and f represents the number of the substituents. Q represents an atom or a group selected from hydrogen, a halogen, an alkyl group, a substituted alkyl group, a nitro group, a cyano group, a thioalkyl group, an alkoxy group, an aryl group, a substituted aryl group, an alkyl ester group, and a substituted alkyl ester group, for example. A plurality of Qs may be the same or different from each other. Examples of the halogen include fluorine, chlorine, bromine, and iodine. An example of the substituted alkyl group includes a halogenated alkyl group. An example of the substituted aryl group includes a halogenated aryl group. f represents an integer of 0 to 4, and g represents an integer of 0 to 3. h represents an integer of 1 to 3. g and h are each preferably larger than 1.

In the above formula (4), $R^{10}$ and $R^{11}$ independently represent an atom or a group selected from hydrogen, a halogen, a phenyl group, a substituted phenyl group, an alkyl group, and a substituted alkyl group. Preferably, $R^{10}$ and $R^{11}$ independently represent a halogenated alkyl group.

In the above formula (5), $M^1$ and $M^2$ independently represent a halogen, an alkyl group having 1 to 3-carbon atoms, a halogenated alkyl group having 1 to 3 carbon atoms, a phenyl group, or a substituted phenyl group, for example. Examples of the halogen include fluorine, chlorine, bromine, and iodine. An example of the substituted phenyl group includes a substituted phenyl group having at least one type of substituent selected from the group consisting of a halogen, an alkyl group having 1 to 3 carbon atoms, and a halogenated alkyl group having 1 to 3 carbon atoms.

A specific example of the polyimide represented by the above formula (3) includes a compound represented by the following formula (6).

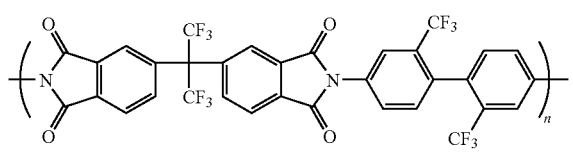

Another example of the polyimide includes a copolymer prepared through arbitrary copolymerization of acid dianhydride having a skeleton (repeating unit) other than that as described above and diamine.

An example of the acid dianhydride includes an aromatic tetracarboxylic dianhydride. Examples of the aromatic tetracarboxylic dianhydride include pyromellitic dianhydride, benzophenone tetracarboxylic dianhydride, naphthalene tetracarboxylic dianhydride, heterocyclic aromatic tetracarboxylic dianhydride, and 2,2'-substituted biphenyltetracarboxylic dianhydride.

Examples of the pyromellitic dianhydride include: pyromellitic dianhydride; 3,6-diphenyl pyromellitic dianhydride; 3,6-bis(trifluoromethyl)pyromellitic dianhydride; 3,6-dibromopyromellitic dianhydride; and 3,6-dichloropyromellitic dianhydride. Examples of the benzophenone tetracarboxylic dianhydride include: 3,3',4,4'-benzophenone tetracarboxylic dianhydride; 2,3,3',4'-benzophenone tetracarboxylic dianhydride; and 2,2',3,3'-benzophenone tetracarboxylic dianhydride. Examples of the naphthalene tetracarboxylic dianhydride include: 2,3,6,7-naphthalene tetracarboxylic dianhydride; 1,2,5,6-naphthalene tetracarboxylic dianhydride; and 2,6-dichloronaphthalene-1,4,5,8-tetracarboxylic dianhydride. Examples of the heterocyclic aromatic tetracarboxylic dianhydride include: thiophene-2,3,4,5-tetracarboxylic dianhydride; pyrazine-2,3,5,6-tetracarboxylic dianhydride; and pyridine-2,3,5,6-tetracarboxylic dianhydride. Examples of the 2,2'-substituted biphenyltetracarboxylic dianhydride include: 2,2'-dibromo-4,4',5,5'-biphenyltetracarboxylic dianhydride; 2,2'-dichloro-4,4',5,5'-biphenyltetracarboxylic dianhydride; and 2,2'-bis(trifluoromethyl)-4,4',5,5'-biphenyltetracarboxylic dianhydride.

Further examples of the aromatic tetracarboxylic dianhydride include: 3,3',4,4'-biphenyltetracarboxylic dianhydride; bis(2,3-dicarboxyphenyl)methane dianhydride; bis(2,5,6-trifluoro-3,4-dicarboxyphenyl)methane dianhydride; 2,2-bis(3,4-dicarboxyphenyl)-1,1,1,3,3,3-hexafluoropropane dianhydride; 4,4'-bis(3,4-dicarboxyphenyl)-2,2-diphenylpropane dianhydride; bis(3,4-dicarboxyphenyl)ether dianhydride; 4,4'-oxydiphthalic dianhydride; bis(3,4-dicarboxyphenyl)sulfonic dianhydride; 3,3',4,4'-diphenylsulfone tetracarboxylic dianhydride; 4,4'-[4,4'-isopropylidene-di(p-phenyleneoxy)]bis(phthalic anhydride); N,N-(3,4-dicarboxyphenyl)-N-methylamine dianhydride; and bis(3,4-dicarboxyphenyl)diethylsilane dianhydride.

Of those, the aromatic tetracarboxylic dianhydride is preferably 2,2'-substituted biphenyltetracarboxylic dianhydride, more preferably 2,2'-bis(trihalomethyl)-4,4',5,5'-biphenyltetracarboxylic dianhydride, and furthermore preferably 2,2'-bis(trifluoromethyl)-4,4',5,5'-biphenyltetracarboxylic dianhydride.

An example of the diamine includes aromatic diamine. Specific examples of the aromatic diamine include benzenediamine, diaminobenzophenone, naphthalenediamine, heterocyclic aromatic diamine, and other aromatic diamines.

Examples of the benzenediamine include benzenediamines such as o-, m-, or p-phenylenediamine, 2,4-diaminotoluene, 1,4-diamino-2-methoxybenzene, 1,4-diamino-2-phenylbenzene, and 1,3-diamino-4-chlorobenzene. Examples of the diaminobenzophenone include 2,2'-diaminobenzophenone and 3,3'-diaminobenzophenone. Examples of the naphthalenediamine include 1,8-diaminonaphthalene and 1,5-diaminonaphthalene. Examples of the heterocyclic aromatic diamine include 2,6-diaminopyridine, 2,4-diaminopyridine, and 2,4-diamino-S-triazine.

Further examples of the aromatic diamine include: 4,4'-diaminobiphenyl; 4,4'-diaminodiphenylmethane; 4,4'-(9-fluorenylidene)-dianiline; 2,2'-bis(trifluoromethyl)-4,4'-diaminobiphenyl; 3,3'-dichloro-4,4'-diaminodiphenylmethane; 2,2'-dichloro-4,4'-diaminobiphenyl; 2,2',5,5'-tetrachlorobenzidine; 2,2-bis(4-aminophenoxyphenyl)propane; 2,2-bis(4-aminophenyl)propane; 2,2-bis(4-aminophenyl)-1,1,1,3,3,3-hexafluoropropane; 4,4'-diaminodiphenyl ether; 3,4'-diaminodiphenyl ether; 1,3-bis(3-aminophenoxy)benzene; 1,3-bis(4-aminophenoxy)benzene; 1,4-bis(4-aminophenoxy)benzene; 4,4'-bis(4-aminophenoxy)biphenyl; 4,4'-bis(3-aminophenoxy)biphenyl; 2,2-bis[4-(4-aminophenoxy)phenyl]propane; 2,2-bis[4-(4-aminophenoxy)phenyl]-1,1,1,3,3,3-hexafluoropropane; 4,4'-diaminodiphenyl thioether; and 4,4'-diaminodiphenylsulfone.

Next, description will be given of a method of forming a second birefringent layer through coating by using a non-liquid crystalline polymer as described above. The method of forming a second birefringent layer may employ any appropriate method as long as a second birefringent layer having the optical properties as described above can be obtained. A typical production method includes a step of applying a solution of the non-liquid crystalline polymer to a substrate film and a step of forming a non-liquid crystalline polymer layer by removing a solvent in the solution. The non-liquid crystalline polymer layer may be formed through direct application to a polarizer (typically, a protective layer of a polarizer) (that is, the protective layer of the polarizer may also serve as a substrate film), or the non-liquid crystalline polymer layer may be formed on any appropriate substrate and then transferred to a polarizer (typically, a protective layer of a polarizer). A method involving transfer may further include peeling off of the substrate.

The substrate film may employ any appropriate film. A typical example of the substrate film is a plastic film to be used for the protective layer of the polarizer as described above. The protective layer of the polarizer itself may also serve as a substrate film.

Examples of the solvent of the coating solution include, but not limited to: halogenated hydrocarbons such as chloroform, dichloromethane, carbon tetrachloride, dichloroethane, tetrachloroethane, trichloroethylene, tetrachloroethylene, chlorobenzene, and ortho-dichlorobenzene; phenols such as phenol and parachlorophenol; aromatic hydrocarbons such as benzene, toluene, xylene, methoxybenzene, and 1,2-dimethoxybenzene; ketone-based solvents such as acetone, methyl ethyl ketone, methyl isobutyl ketone, cyclohexanone, cyclopentanone, 2-pyrrolidone, and N-methyl-2-pyrrolidone; ester-based solvents such as ethyl acetate and butyl acetate; alcohol-based solvents such as t-butyl alcohol, glycerine, ethylene glycol, triethylene glycol, ethylene glycol monomethylether, diethylene glycol dimethylether, propylene glycol, dipropylene glycol, and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether, and tetrahydrofurane; carbon disulfide; ethyl cellosolve; and butyl cellosolve. Of those, methyl isobutyl ketone is preferred, because non-liquid crystal materials exhibits high solubility in the solvent and the solvent does not corrode the substrate. Each of those solvents can be used alone, or two or more of them can be used in combination.

The concentration of the non-liquid crystalline polymer in the application solution may employ any appropriate concentration as long as a second birefringent layer as described above can be obtained and the application solution can be applied. For example, the solution contains preferably 5 to 50 parts by weight, and more preferably 10 to 40 parts by weight of the non-liquid crystalline polymer with respect to 100 parts by weight of a solvent. The solution having such a concentration range has a viscosity allowing easy application.

The application solution may further contain various additives such as a stabilizer, a plasticizer, and metals as required.

The application solution may further contain another different resin as required. Examples of the other resin include various general-purpose resins, an engineering plastic, a thermoplastic resin, and a heat-curable resin. Such a resin is used in combination, and thus a second birefringent layer having appropriate mechanical strength or durability in accordance with the purpose can be formed.

Examples of the general-purpose resin include polyethylene (PE), polypropylene (PP), polystyrene (PS), polymethylmethacrylate (PMMA), an ABS resin, and an AS resin. Examples of the engineering plastic include polyacetate (POM), polycarbonate (PC), polyamide (PA: nylon), polyethylene terephthalate (PET), and polybutylene terephthalate (PBT). Examples of the thermoplastic resin include polyphenylene sulfide (PPS), polyether sulfone (PES), polyketone (PK), polyimide (PI), polycyclohexane dimethanol terephthalate (PCT), polyallylate (PAR), and a liquid crystal polymer (LCP). Examples of the thermosetting resin include an epoxy resin and a phenol novolac resin. The type and amount of another different resin to be added to the application solution may appropriately be set in accordance with the purpose. For example, such a resin is added to the non-liquid crystalline polymer in a ratio of preferably 0 to 50% by weight, and more preferably 0 to 30% by weight.

Examples of a method of applying the solution include: a spin coating method; a roll coating method; a flow coating method; a printing method; a dip coating method; a flow casting method; a bar coating method; and a gravure printing method. For application, a polymer layer superposition method may also be used as required.

After application, the solvent in the above-mentioned solution is evaporated and removed by drying such as natural drying, air drying, or heat drying (at 60 to 250° C., for example), to thereby form a film-like optical compensation layer.

Examples of a material used for forming the second birefringent layer include: poly(4,4'-hexafluoroisopropylidenebisphenol)terephthalate-co-isophthalate; poly(4,4'-hexahydro-4,7-methanoindane-5-ylidenebisphenol)terephthalate; poly(4,4'-isopropylidene-2,2',6,6'-tetrachlorobisphenol) terephthalate-co-isophthalate; poly(4,4'-hexafluoroisopropylidene)-bisphenol-co-(2-norbornylidene)-bisphenol-terephthalate; poly(4,4'-hexahydro-4,7-methanoindene-5-ylidene)-bisphenol-co-(4,4'-isopropylidene-2,2',6,6'-tetrabromo)-bisphenolterephthalate; poly(4,4'-isopropylidene-bisphenol-co-4,4'-(2-norbornylidene) bisphenol)terephthalate-co-isophthalate; and copolymers thereof. One kind of material may be used, or two or more kinds thereof may be used in combination.

G. Lamination of Second Birefringent Layer and Second Polarizer

As described above, the second birefringent layer of the present invention is preferably formed as a coated layer on a substrate. In the case where the substrate also serves as a protective layer of the polarizer (for example, in the case where the substrate is formed of a cellulose-based film such as a triacetyl cellulose film), a side opposite to the coated layer of the substrate is preferably directly laminated to the second polarizer through a pressure-sensitive adhesive or an adhesive. In the case where the substrate does not serve as a protective layer of the polarizer, the coated layer is transferred to the second polarizer (typically, a protective layer of the second polarizer), and the substrate is preferably peeled off. Details of the pressure-sensitive adhesive and the adhesive are as described above.

Hereinafter, the present invention will be more specifically described by way of examples. However, the present invention is not limited to the examples. Methods of measuring characteristics in the examples are as described below.

(Measurement of Retardation)

Refractive indices nx, ny, and nz of a sample film were measured with an automatic birefringence analyzer (Automatic birefringence analyzer KOBRA-WPR manufactured by Oji Scientific Instruments), and an in-plane retardation Δnd and a thickness direction retardation Rth were calculated. A measurement temperature was 23° C., and a measurement wavelength was 590 nm.

(Measurement of Contrast)

Figure 4:
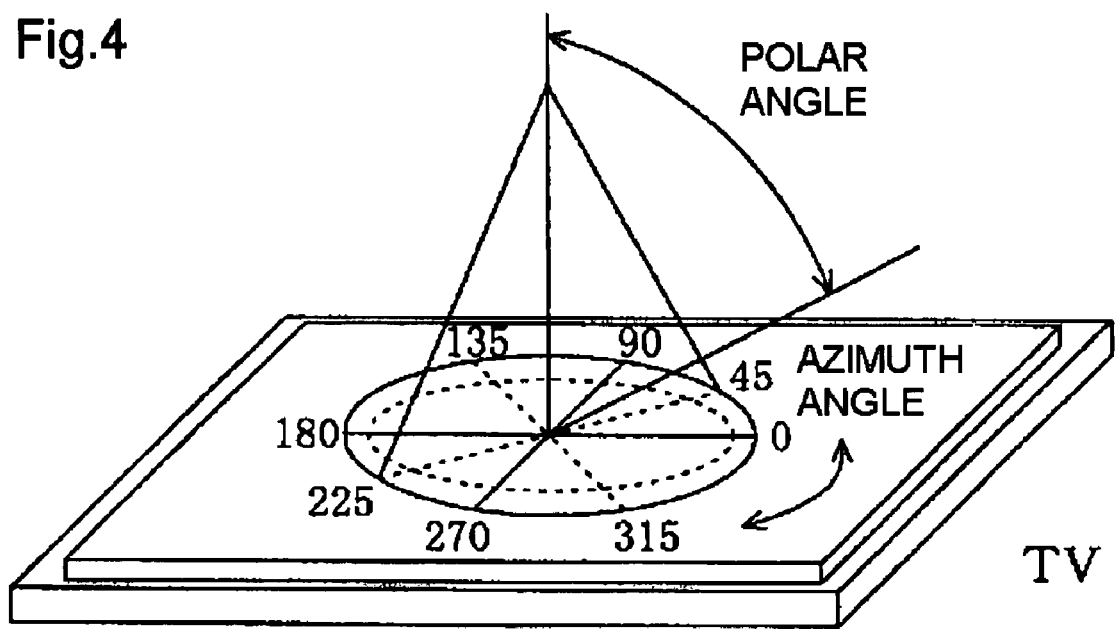
FIG. 4 is a schematic diagram illustrating an azimuth angle and a polar angle in the present invention.
Figure 5A:
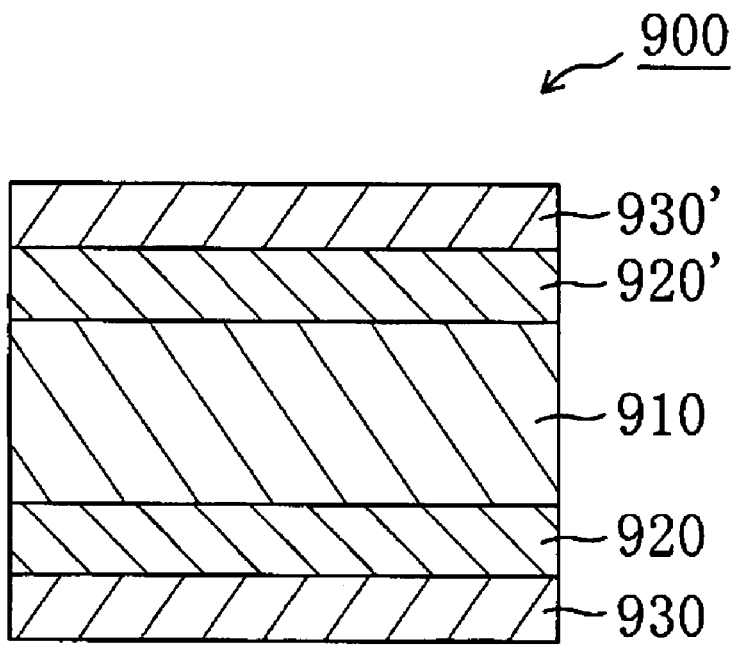
FIG. 5A is a schematic sectional view of a typical conventional liquid crystal display apparatus.
Figure 5B:
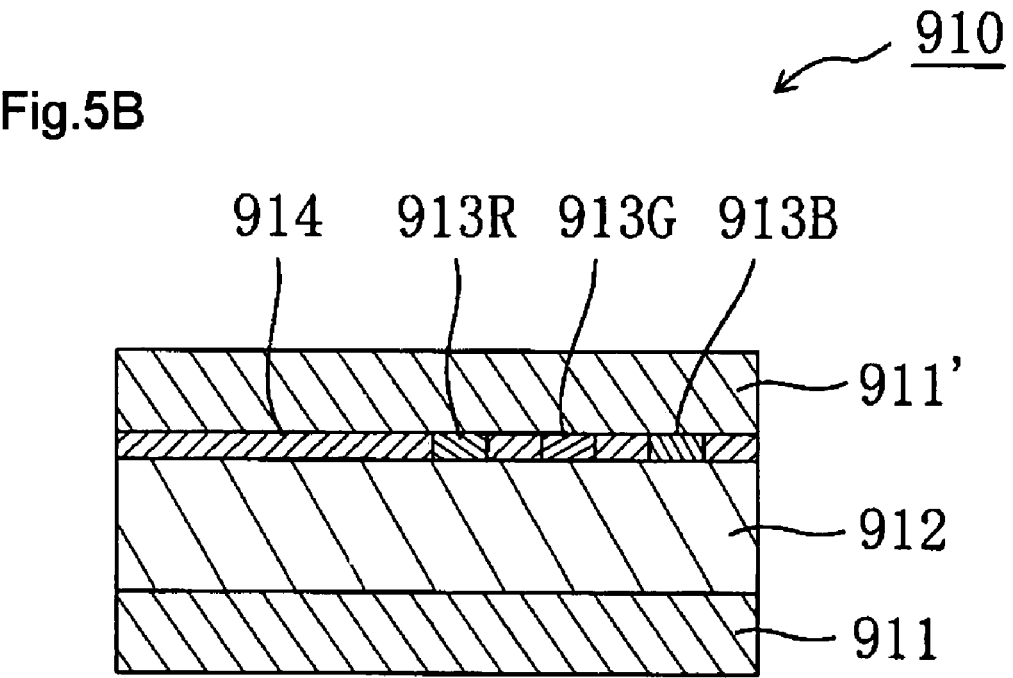
FIG. 5B is a schematic sectional view of a liquid crystal cell to be used in the liquid crystal display apparatus.

An azimuth angle was varied from 0 to 360° at a polar angle of 60°, and contrasts at azimuth angles of 45°, 135°, 225°, and 315° were measured by using "EZ Contrast 160D" (trade name, manufactured by ELDIM SA). An average value of the contrasts was determined. Note that the azimuth angle and the polar angle are as shown in FIG. 4.

(Measurement of Color Shift)

Tones of a liquid crystal display apparatus at an azimuth angle varying from 0 to 360° and a polar angle of 60° were measured by using "EZ Contrast 160D" (trade name, manufactured by ELDIM SA), and were plotted on an xy chromaticity diagram.

(Measurement of Black Luminance)

A relationship between the azimuth angle and black luminance was plotted at a polar angle of 60° and an azimuth angle varying from −180 to 180° by using "EZ Contrast 160D" (tradename, manufactured by ELDIM SA).

REFERENCE EXAMPLE 1

Production of Polarizer (May Be Referred To As First Polarizer or Second Polarizer)

A polyvinyl alcohol film was colored in an aqueous solution containing iodine, and the resultant was uniaxially stretched to a six times length between rolls with different speed ratios in an aqueous solution containing boric acid, to thereby produce a polarizer.

REFERENCE EXAMPLE 2

Preparation of Polyvinyl Alcohol-based Adhesive 50 parts by weight of methylol melamine with respect to 100 parts by weight of a polyvinyl alcohol-based resin having an acetoacetyl group (trade name: "GOHSEFIMER Z200", available from Nippon Synthetic Chemical Industry Co., Ltd., average degree of polymerization: 1,200, degree of saponification: 98.5 mol %; degree of acetoacetylation: 5 mol %) was dissolved in pure water under temperature conditions of 30° C., to thereby prepare an aqueous solution adjusted to have a solid content of 3.7%. To 100 parts by weight of this aqueous solution, 18 parts by weight of an aqueous alumina colloidal solution (average particle size: 15 nm, solid content: 10%, positive charge) was added, to thereby prepare an aqueous adhesive solution. A viscosity of the aqueous adhesive solution was 9.6 mPa·s. A pH of the aqueous adhesive solution was 4 to 4.5.

EXAMPLE 1

(Production of Polarizing Plate-integrated Retardation Film (1A))

A norbornene-based resin film (available from Zeon Corporation, trade name: ZEONOR, number: ZF14-100, thickness: 100 µm) was subjected to fixed-end stretching to a 2.6 times length in a TD direction at 150° C., to thereby produce a first birefringent layer. The first birefringent layer had a thickness of 33 µm and an Nz of 1.3 (Rth=170 nm, Δnd=130 nm).

Attachment was conducted such that an absorption axis of the first polarizer and a slow axis of the first birefringent layer were perpendicular to each other. Further, a triacetyl cellulose (TAC) film (thickness: 80 µm) was attached to the first polarizer on a side opposite to the first birefringent layer. Each layer was attached through a polyvinyl alcohol-based adhesive (thickness: 0.1 µm).

(Production of Polarizing Plate-integrated Retardation Film (1B))

A solution (concentration: 10 wt %) prepared by dissolving polyimide synthesized from 2,2'-bis(3,4-dicarboxyphenyl) hexafluoropropane and 2,2'-bis(trifluoromethyl)-4,4'-diaminobiphenyl in methyl isobutyl ketone (MIBK) as a solvent was applied to a TAC substrate (thickness: 80 µm) at a thickness of 30 µm. Then, the whole was subjected to drying treatment at 120° C. for 10 minutes, to thereby obtain a substrate-integrated second birefringent layer including a polyimide layer with a thickness of about 3 µm. A refractive index profile of the obtained second birefringent layer was nx=ny>nz. The second polarizer was attached to a substrate side of the substrate-integrated second birefringent layer by using a polyvinyl alcohol-based adhesive (thickness: 0.1 µm) such that an absorption axis of the second polarizer and a slow axis of the second birefringent layer were perpendicular to each other. Further, a triacetyl cellulose (TAC) film (thickness: 80 µm) was attached to the second polarizer on a side opposite to the second birefringent layer by using a polyvinyl alcohol-based adhesive (thickness: 0.1 µm).

(Production of Liquid Crystal Panel (1C))

A liquid crystal cell (VA mode) was taken out of a liquid crystal panel (manufactured by Sony Corporation, BRAVIA, 32-inch panel), and the polarizing plate-integrated retardation film (1A) and the polarizing plate-integrated retardation film (1B) were attached above and below the liquid crystal cell to sandwich the liquid crystal cell by using an acrylic pressure-sensitive adhesive (thickness: 20 µm) such that absorption axes of polarizers included in the polarizing plate-integrated retardation film (1A) and the polarizing plate-integrated retardation film (1B) were perpendicular to each other. Attachment was conducted such that the polarizing plate-integrated retardation film (1B) was arranged on a backlight side and the polarizing plate-integrated retardation film (1A) was arranged on a viewer side.

(Evaluation)

Figure 6:
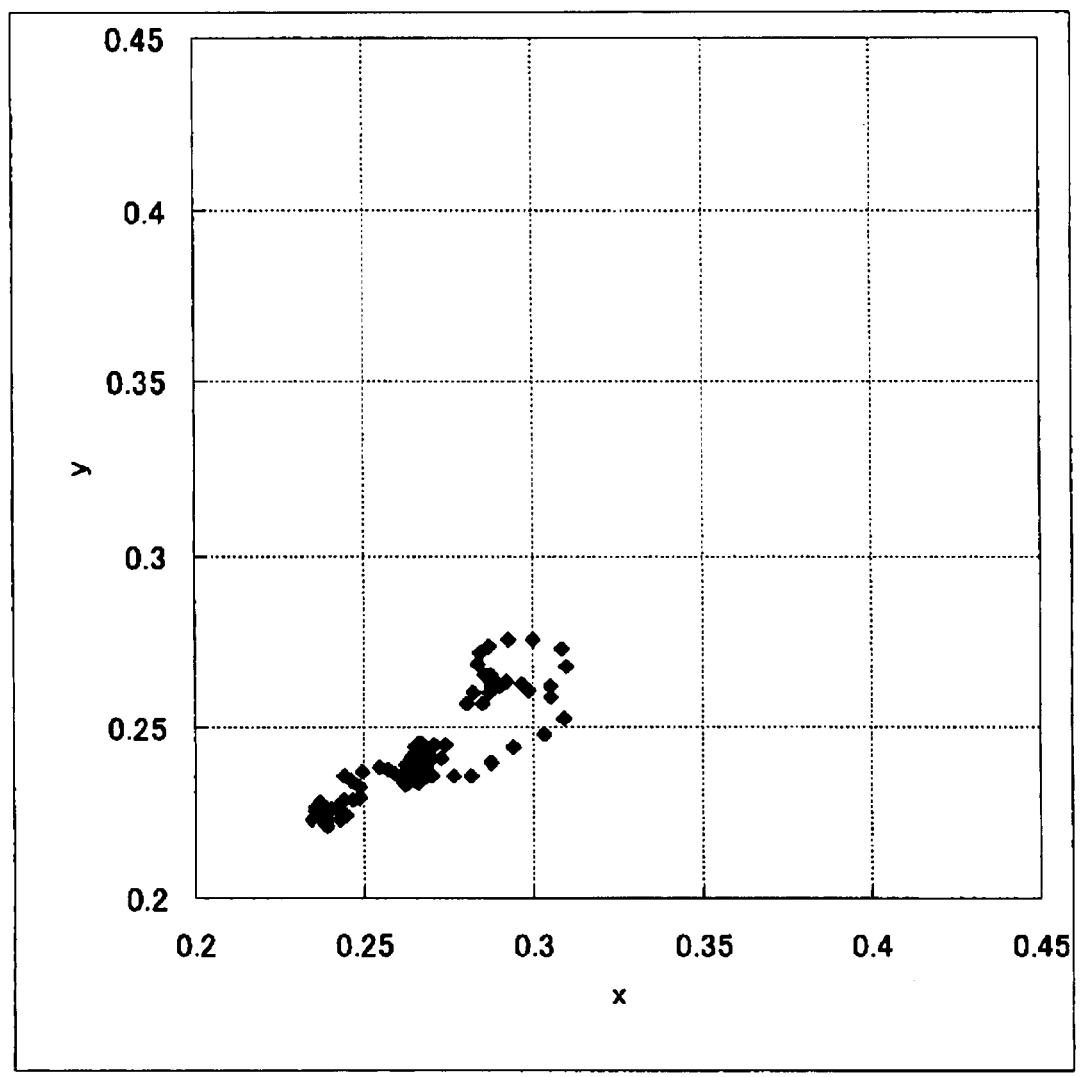
FIG. 6 is an xy chromaticity diagram showing color shift measured in Example 1.
Figure 7:
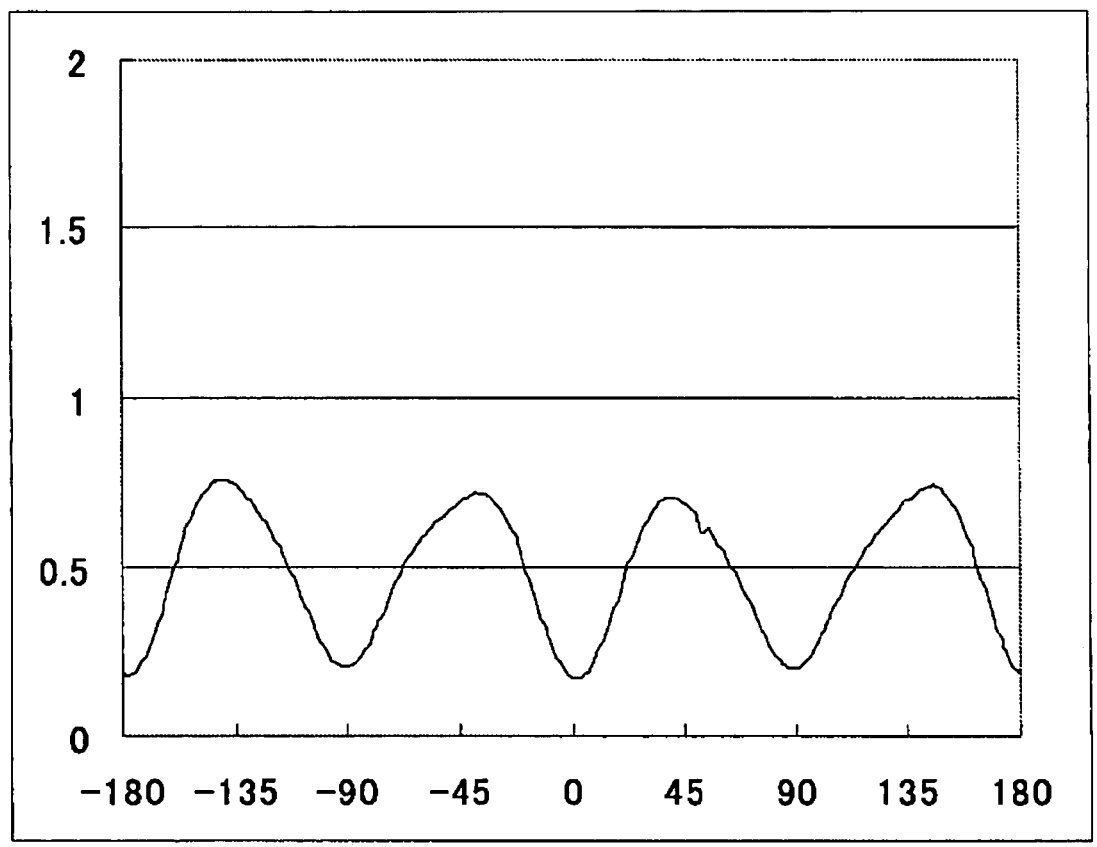
FIG. 7 is a graph showing black luminance measured in Example 1.

The contrast of the obtained liquid crystal panel (1C) was determined following the evaluation method described above. Table 1 shows the results. FIG. 6 shows the measurement results (xy chromaticity diagram) of color shift, and FIG. 7 shows the measurement results of black luminance.

COMPARATIVE EXAMPLE 1

(Production of Polarizing Plate-integrated Retardation Film (C1A))

A solution (concentration: 10 wt %) prepared by dissolving polyimide synthesized from 2,2'-bis(3,4-dicarboxyphenyl) hexafluoropropane and 2,2'-bis(trifluoromethyl)-4,4'-diaminobiphenyl in methyl isobutyl ketone (MIBK) as a solvent was applied to a TAC substrate (thickness: 80 µm) at a thickness of 30 µm. Then, the whole was subjected to drying treatment at 120° C. for 10 minutes, to thereby obtain a substrate-integrated birefringent layer including a polyimide layer with a thickness of about 3 µm. The obtained substrate-integrated birefringent layer was subjected to transverse stretching to a 1.2 times length at 150° C. The refractive index profile of the obtained birefringent layer was nx>ny>nz, and Nz was 4.9. A polarizer was attached to a substrate side of the substrate-integrated birefringent layer by using a polyvinyl alcohol-based adhesive (thickness: 0.1 µm) such that an absorption axis of the polarizer and a slow axis of the birefringent layer were perpendicular to each other. Further, a triacetyl cellulose (TAC) film (thickness: 80 µm) was attached to the polarizer on a side opposite to the birefringent layer by using a polyvinyl alcohol-based adhesive (thickness: 0.1 µm).

(Production of Liquid Crystal Panel (C1C))

A liquid crystal cell (VA mode) was taken out of a liquid crystal panel (manufactured by Sony Corporation, BRAVIA, 32-inch panel), and the polarizing plate-integrated retardation film (C1A) and a polarizing plate (trade name: SEG1224) available from Nitto Denko Corporation were attached above and below the liquid crystal cell to sandwich the liquid crystal cell by using an acrylic pressure-sensitive adhesive (thickness: 20 µm) such that absorption axes of polarizers included in the polarizing plate-integrated retardation film (C1A) and SEG1224 were perpendicular to each other. Attachment was conducted such that the polarizing plate-integrated retardation film (C1A) was arranged on a backlight side and SEG1224 was arranged on a viewer side.

(Evaluation)

Figure 8:
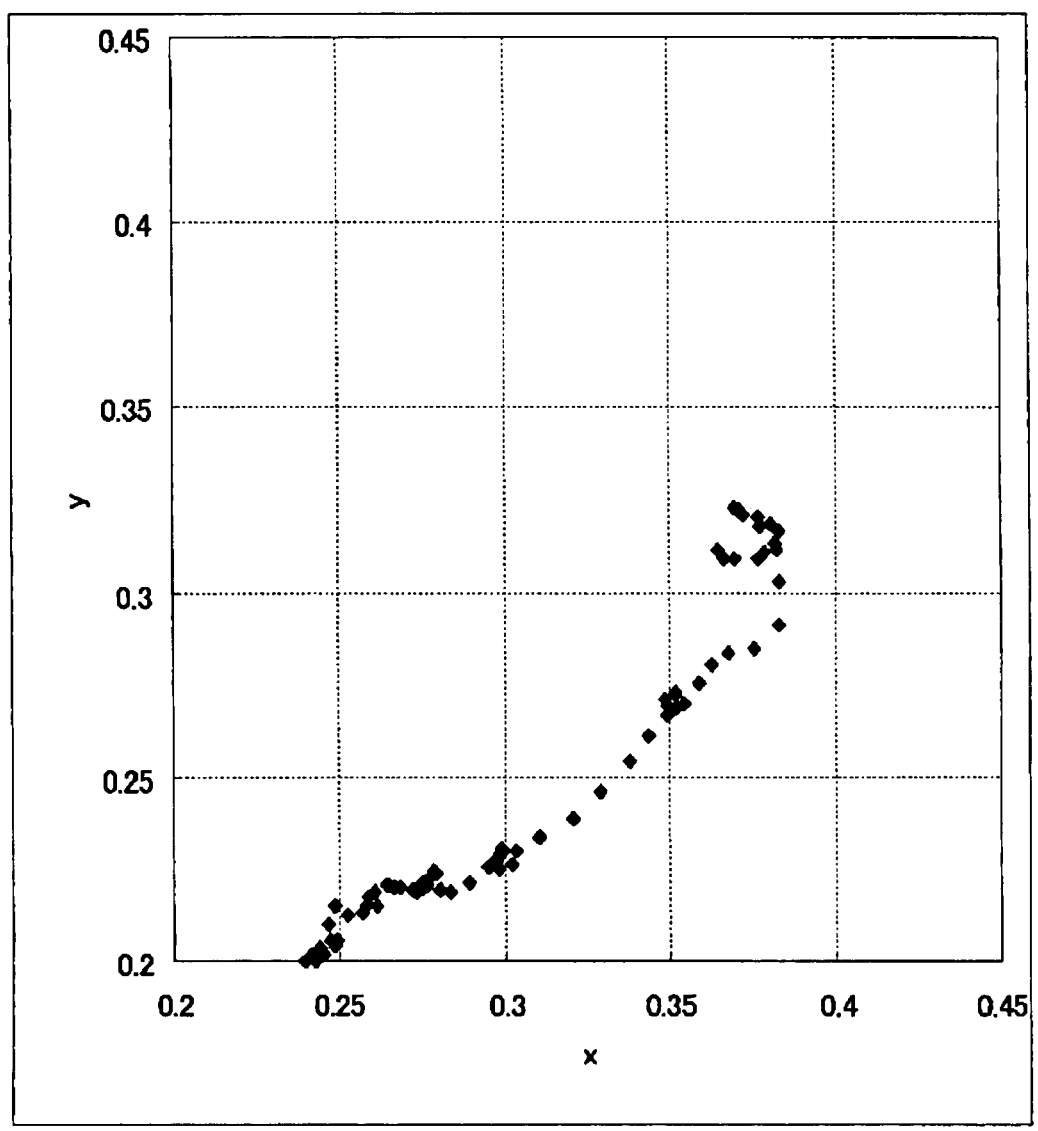
FIG. 8 is an xy chromaticity diagram showing color shift measured in Comparative Example 1.
Figure 9:
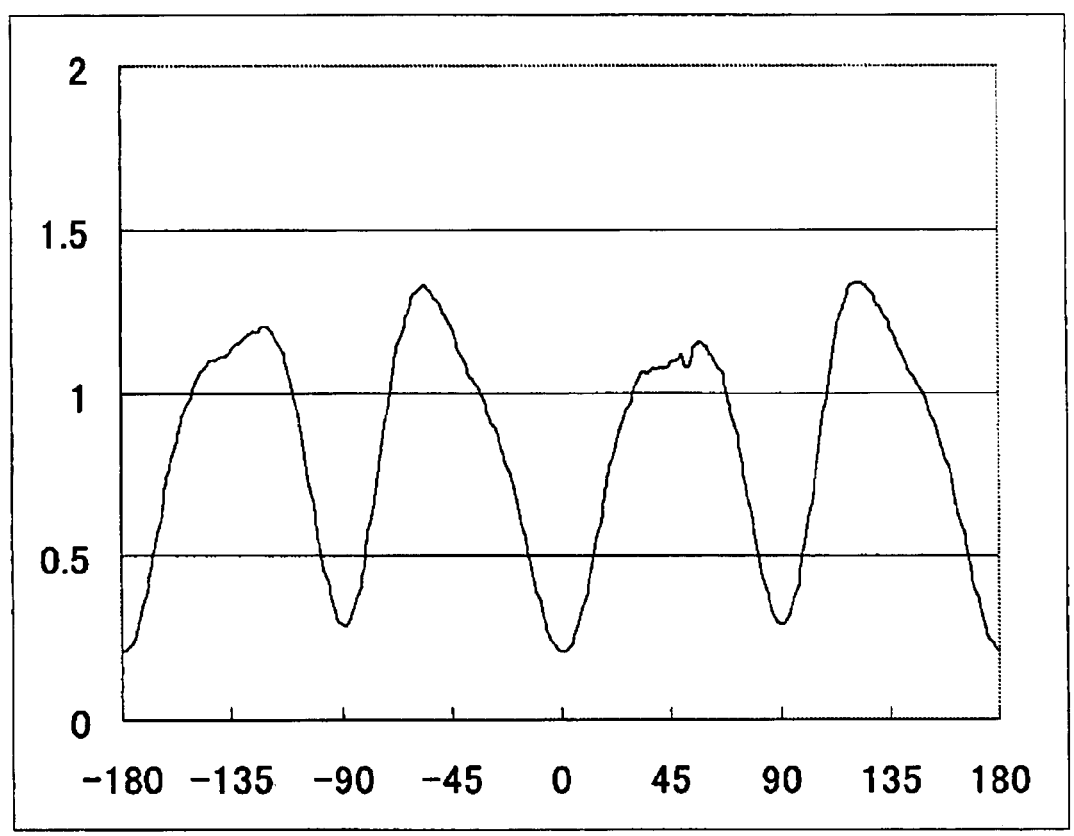
FIG. 9 is a graph showing black luminance measured in Comparative Example 1.

The contrast of the obtained liquid crystal panel (C1C) was determined following the evaluation method described above. Table 1 shows the results. FIG. 8 shows the measurement results (xy chromaticity diagram) of color shift, and FIG. 9 shows the measurement results of black luminance.

COMPARATIVE EXAMPLE 2

(Production of Polarizing Plate-integrated Retardation Film (C2A))

A norbornene-based resin film (available from Zeon Corporation, trade name: ZEONOR, number: ZF14-100, thickness: 100 μm) was subjected to free-end stretching to a 1.46 times length in an MD direction at 150° C., to thereby produce a first birefringent layer. The first birefringent layer had a thickness of 68 μm and an Nz of 1.0 (Δnd=140 nm).

Attachment was conducted such that an absorption axis of the first polarizer and a slow axis of the first birefringent layer were perpendicular to each other. Further, a triacetyl cellulose (TAC) film (thickness: 80 μm) was attached to the first polarizer on a side opposite to the first birefringent layer. Each layer was attached through a polyvinyl alcohol-based adhesive (thickness: 0.1 μm).

(Production of Polarizing Plate-integrated Retardation Film (C2B))

A solution (concentration: 10 wt %) prepared by dissolving polyimide synthesized from 2,2'-bis(3,4-dicarboxyphenyl) hexafluoropropane and 2,2'-bis(trifluoromethyl)-4,4'-diaminobiphenyl in methyl isobutyl ketone (MIBK) as a solvent was applied to a TAC substrate (thickness: 80 μm) at a thickness of 30 μm. Then, the whole was subjected to drying treatment at 120° C. for 10 minutes, to thereby obtain a substrate-integrated second birefringent layer including a polyimide layer with a thickness of about 3 μm. The refractive index profile of the obtained second birefringent layer was nx=ny>nz. The second polarizer was attached to a substrate side of the substrate-integrated second birefringent layer by using a polyvinyl alcohol-based adhesive (thickness: 0.1 μm) such that an absorption axis of the second polarizer and a slow axis of the second birefringent layer were perpendicular to each other. Further, a triacetyl cellulose (TAC) film (thickness: 80 μm) was attached to the polarizer on a side opposite to the second birefringent layer by using a polyvinyl alcohol-based adhesive (thickness: 0.1 μm).

(Production of Liquid Crystal Panel (C2C))

A liquid crystal cell (VA mode) was taken out of a liquid crystal panel (manufactured by Sony Corporation, BRAVIA, 32-inch panel), and the polarizing plate-integrated retardation film (C2A) and the polarizing plate-integrated retardation film (C2B) were attached above and below the liquid crystal cell to sandwich the liquid crystal cell by using an acrylic pressure-sensitive adhesive (thickness: 20 μm) such that absorption axes of polarizers included in the polarizing plate-integrated retardation film (C2A) and the polarizing plate-integrated retardation film (C2B) were perpendicular to each other. Attachment was conducted such that the polarizing plate-integrated retardation film (C2B) was arranged on a backlight side and the polarizing plate-integrated retardation film (C2A) was arranged on a viewer side.

(Evaluation)

The contrast of the obtained liquid crystal panel (C2C) was determined following the evaluation method described above. Table 1 shows the results.

EXAMPLE 2

(Production of Polarizing Plate-integrated Retardation Film (2A))

A cellulose ester film (available from Kaneka Corporation, trade name: KA film, thickness: 100 μm) was subjected to free-end stretching to a 1.5 times length in an MD direction at 145° C. and then to a 1.03 times length in a TD direction at 145° C., to thereby produce a first birefringent layer. The first birefringent layer had a thickness of 98 μm and an Nz of 1.6 (Rth=160 nm, Δnd=100 nm).

Attachment was conducted such that an absorption axis of the first polarizer and a slow axis of the first birefringent layer were perpendicular to each other. Further, a triacetyl cellulose (TAC) film (thickness: 80 μm) was attached to the first polarizer on a side opposite to the first birefringent layer. Each layer was attached through a polyvinyl alcohol-based adhesive (thickness: 0.1 μm).

(Production of Polarizing Plate-integrated Retardation Film (2B))

A solution (concentration: 15 wt %) prepared by dissolving polyimide synthesized from 2,2'-bis(3,4-dicarboxyphenyl) hexafluoropropane and 2,2'-bis(trifluoromethyl)-4,4'-diaminobiphenyl in cyclohexane as a solvent was applied to a TAC substrate (thickness: 80 μm) at a thickness of 30 μm. Then, the whole was subjected to drying treatment at 100° C. for 10 minutes, to thereby obtain a substrate-integrated second birefringent layer including a polyimide layer with a thickness of about 4 μm. A refractive index profile of the obtained second birefringent layer was nx=ny>nz. The second polarizer was attached to a substrate side of the substrate-integrated second birefringent layer by using a polyvinyl alcohol-based adhesive (thickness: 0.1 μm) such that an absorption axis of the second polarizer and a slow axis of the second birefringent layer were perpendicular to each other. Further, a triacetyl cellulose (TAC) film (thickness: 80 μm) was attached to the second polarizer on a side opposite to the second birefringent layer by using a polyvinyl alcohol-based adhesive (thickness: 0.1 μm).

(Production of Liquid Crystal Panel (2C))

A liquid crystal cell (VA mode) was taken out of a liquid crystal panel (manufactured by Sony Corporation, BRAVIA, 32-inch panel), and the polarizing plate-integrated retardation film (2A) and the polarizing plate-integrated retardation film (2B) were attached above and below the liquid crystal cell to sandwich the liquid crystal cell by using an acrylic pressure-sensitive adhesive (thickness: 20 μm) such that absorption axes of polarizers included in the polarizing plate-integrated retardation film (2A) and the polarizing plate-integrated retardation film (2B) were perpendicular to each other. Attachment was conducted such that the polarizing plate-integrated retardation film (2B) was arranged on a backlight side and the polarizing plate-integrated retardation film (2A) was arranged on a viewer side.

(Evaluation)

Figure 10:
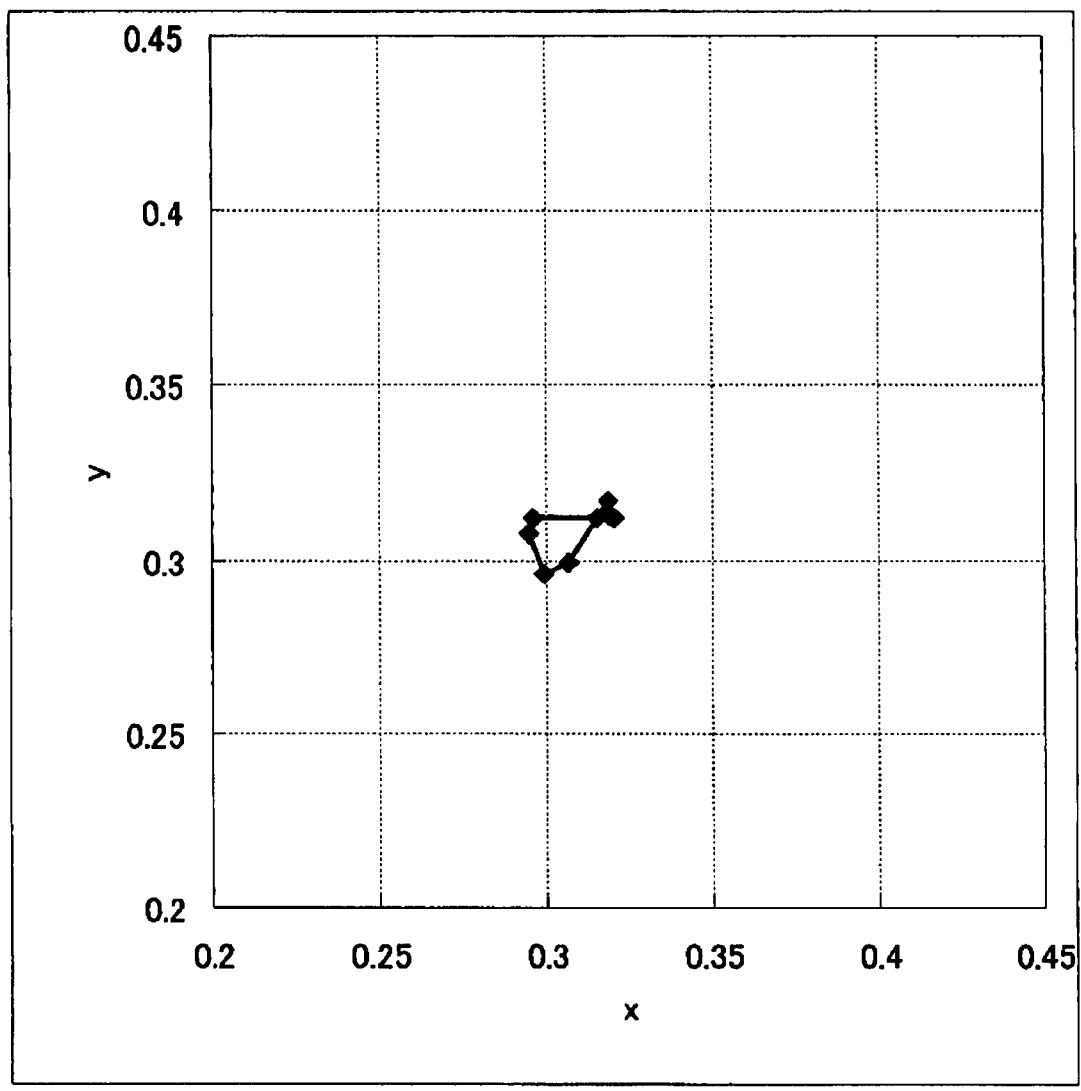
FIG. 10 is an xy chromaticity diagram showing color shift measured in Example 2.
Figure 1:
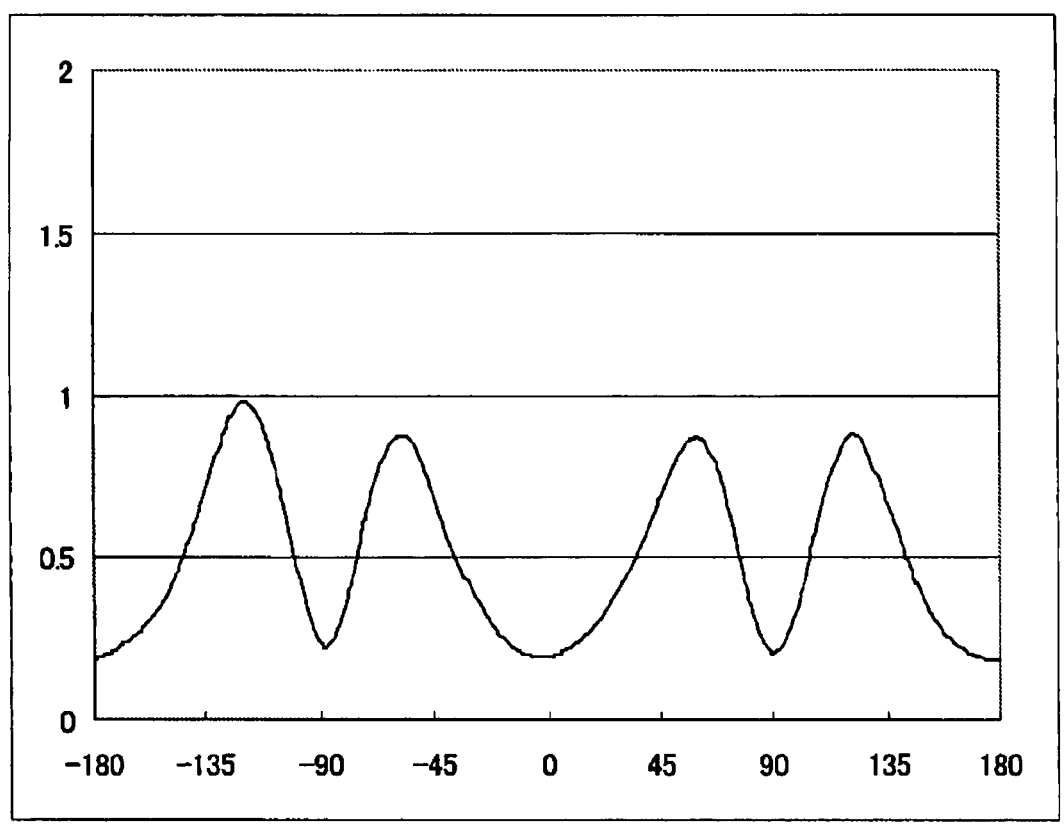
Figure 1:
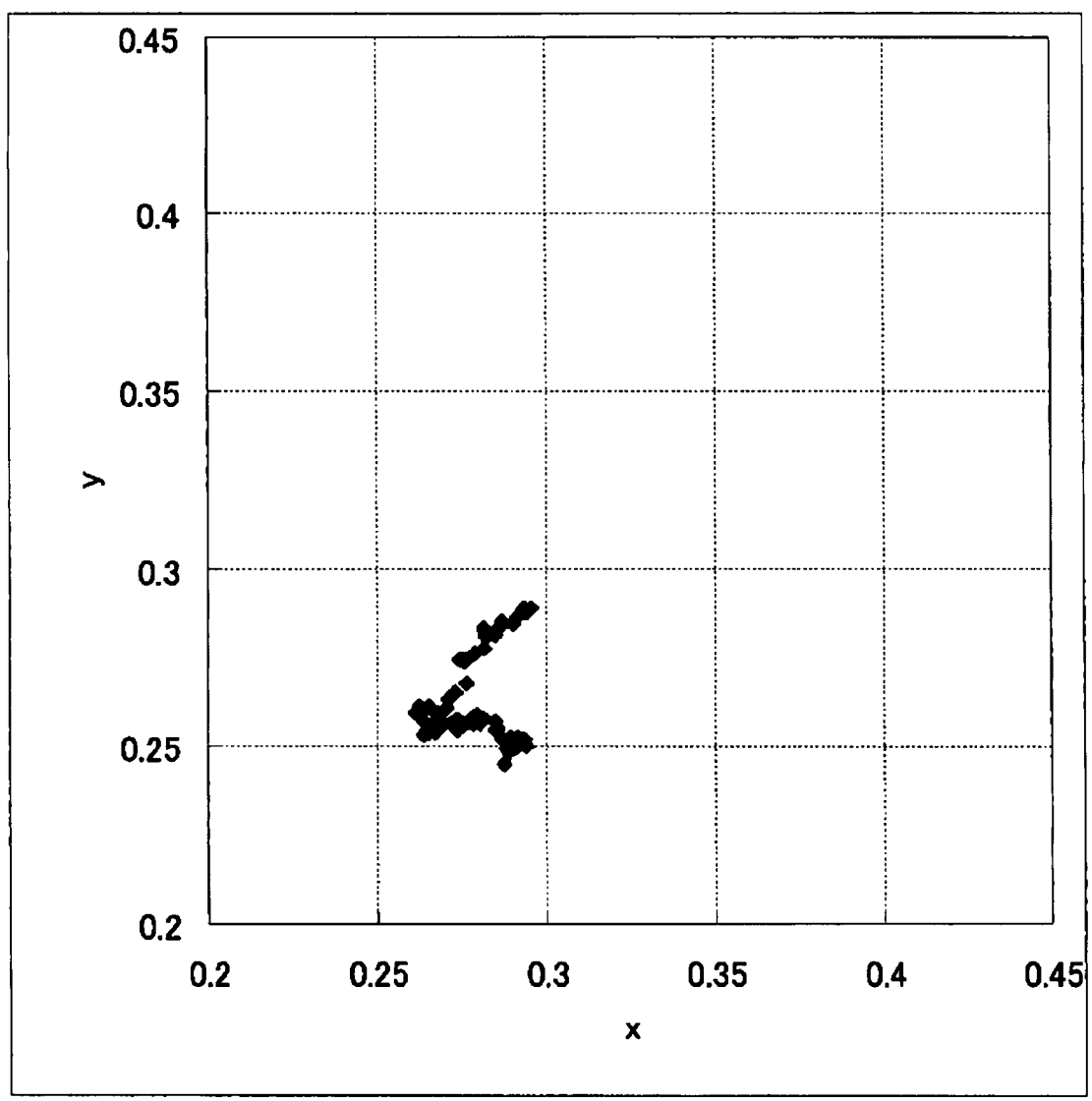

The contrast of the obtained liquid crystal panel (2C) was determined following the evaluation method described above. Table 1 shows the results. FIG. 10 shows the measurement results (xy chromaticity diagram) of color shift, and FIG. 11 shows the measurement results of black luminance.

COMPARATIVE EXAMPLE 3

(Production of Polarizing Plate-integrated Retardation Film (C3A))

A cellulose ester film (available from Kaneka Corporation, trade name: KA film, thickness: 100 µm) was subjected to fixed-end stretching to a 1.5 times length in a TD direction at 150° C., to thereby produce a birefringent layer. The birefringent layer had a thickness of 67 µm and an Nz of 4.2 (Rth=233 nm, Δnd=56 nm).

Attachment was conducted such that an absorption axis of the polarizer and a slow axis of the birefringent layer were perpendicular to each other. Further, a triacetyl cellulose (TAC) film (thickness: 80 µm) was attached to the polarizer on a side opposite to the first birefringent layer. Each layer was attached through a polyvinyl alcohol-based adhesive (thickness: 0.1 µm).

(Production of Polarizing Plate-integrated Retardation Film (C3B))

The polarizing plate-integrated retardation film (2B) produced in Example 2 was used as it is as a polarizing plate-integrated retardation film (C3B).

(Production of Liquid Crystal Panel (C3C))

A liquid crystal cell (VA mode) was taken out of a liquid crystal panel (manufactured by Sony Corporation, BRAVIA, 32-inch panel), and the polarizing plate-integrated retardation film (C3A) and the polarizing plate-integrated retardation film (C3B) were attached above and below the liquid crystal cell to sandwich the liquid crystal cell by using an acrylic pressure-sensitive adhesive (thickness: 20 µm) such that absorption axes of polarizers included in the polarizing plate-integrated retardation film (C3A) and the polarizing plate-integrated retardation film (C3B) were perpendicular to each other. Attachment was conducted such that the polarizing plate-integrated retardation film (C3B) was arranged on a backlight side and the polarizing plate-integrated retardation film (C3A) was arranged on a viewer side.

(Evaluation)

Figure 13:
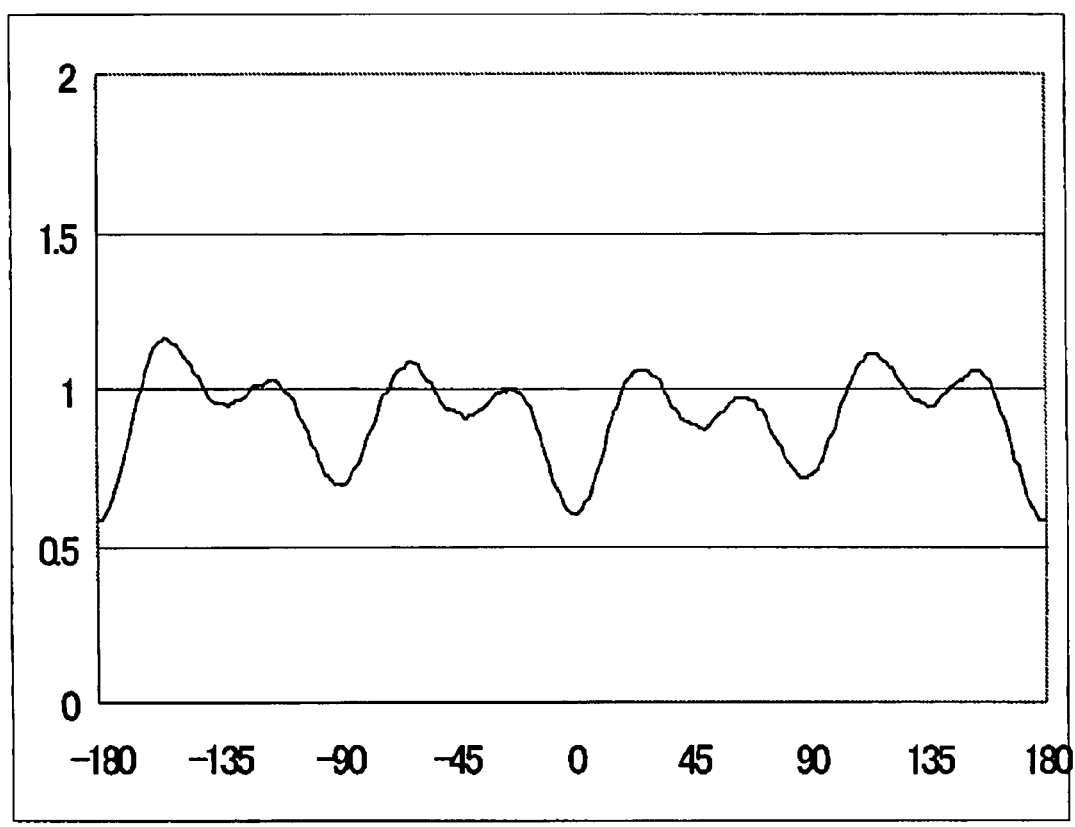
FIG. 13 is a graph showing black luminance measured in Comparative Example 2.

The contrast of the obtained liquid crystal panel (C3C) was determined following the evaluation method described above. Table 1 shows the results. FIG. 12 shows the measurement results (xy chromaticity diagram) of color shift, and FIG. 13 shows the measurement results of black luminance.

EXAMPLE 3

(Production of Polarizing Plate-integrated Retardation Film (3A))

A norbornene-based resin film (available from Zeon Corporation, trade name: ZEONOR, number: ZF14-100, thickness: 130 µm) was subjected to fixed-end stretching to a 3.6 times length in a TD direction at 150° C., to thereby produce a first birefringent layer. The first birefringent layer had a thickness of 40 µm and an Nz of 1.2 (Rth=160 nm, Δnd=130 nm).

Attachment was conducted such that an absorption axis of the first polarizer and a slow axis of the first birefringent layer were perpendicular to each other. Further, a triacetyl cellulose (TAC) film (thickness: 80 µm) was attached to the first polarizer on a side opposite to the first birefringent layer. Each layer was attached through a polyvinyl alcohol-based adhesive (thickness: 0.1 µm).

(Production of Polarizing Plate-integrated Retardation Film (3B))

The polarizing plate-integrated retardation film (1B) produced in Example 1 was used as it is as a polarizing plate-integrated retardation film (3B).

(Production of Liquid Crystal Panel (3C))

A liquid crystal cell (VA mode) was taken out of a liquid crystal panel (manufactured by SHARP CORPORATION, AQUOS, 32-inch panel), and the polarizing plate-integrated retardation film (3A) and the polarizing plate-integrated retardation film (3B) were attached above and below the liquid crystal cell to sandwich the liquid crystal cell by using an acrylic pressure-sensitive adhesive (thickness: 20 µm) such that absorption axes of polarizers included in the polarizing plate-integrated retardation film (3A) and the polarizing plate-integrated retardation film (3B) were perpendicular to each other. Attachment was conducted such that the polarizing plate-integrated retardation film (3B) was arranged on a backlight side and the polarizing plate-integrated retardation film (3A) was arranged on a viewer side.

(Evaluation)

Figure 14:
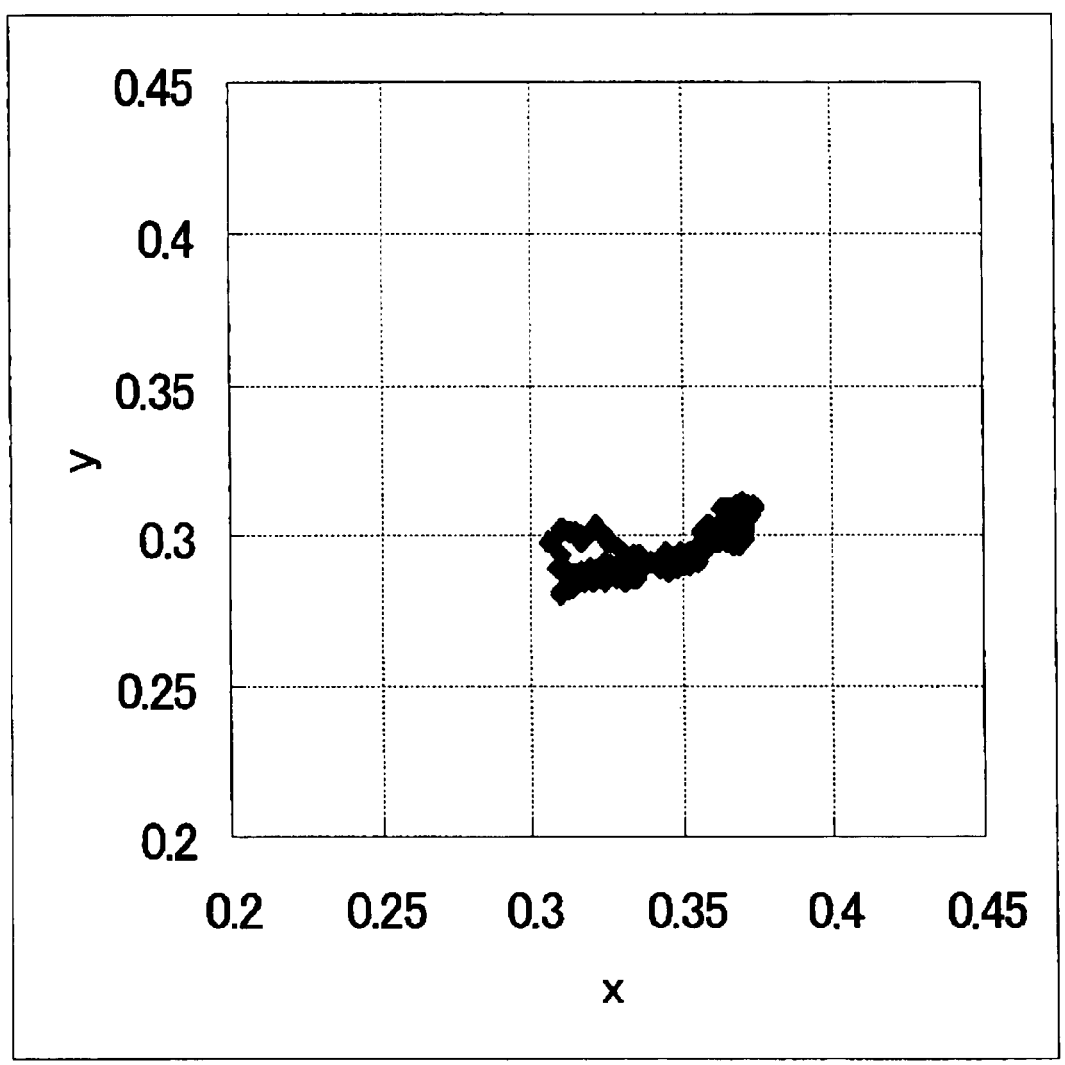
FIG. 14 is an xy chromaticity diagram showing color shift measured in Example 3.
Figure 15:
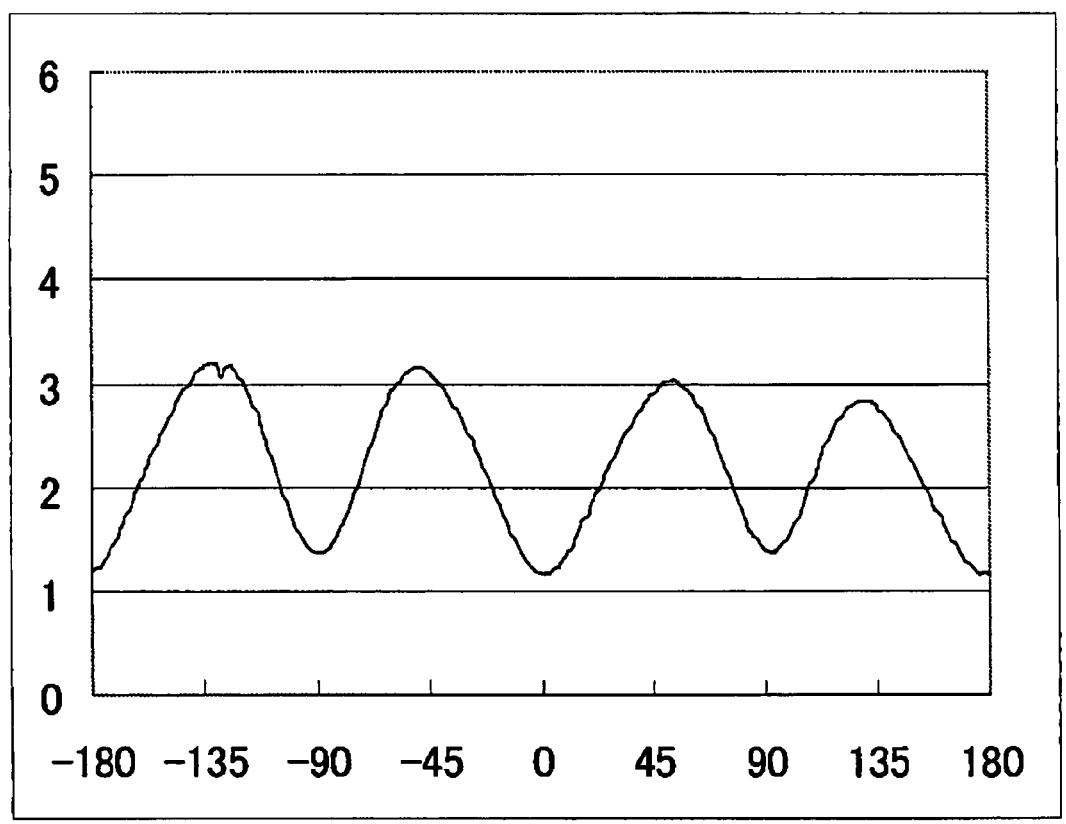
FIG. 15 is a graph showing black luminance measured in Example 3.

The contrast of the obtained liquid crystal panel (3C) was determined following the evaluation method described above. Table 1 shows the results. FIG. 14 shows the measurement results (xy chromaticity diagram) of color shift, and FIG. 15 shows the measurement results of black luminance.

EXAMPLE 4

(Production of Polarizing Plate-integrated Retardation Film (4A))

The polarizing plate-integrated retardation film (1A) produced in Example 1 was used as it is as a polarizing plate-integrated retardation film (4A).

(Production of Polarizing Plate-integrated Retardation Film (4B))

A solution (concentration: 10 wt %) prepared by dissolving polyimide synthesized from 2,2'-bis(3,4-dicarboxyphenyl)hexafluoropropane and 2,2'-bis(trifluoromethyl)-4,4'-diaminobiphenyl in methyl isobutyl ketone (MIBK) as a solvent was applied to a TAC substrate (thickness: 80 µM) at a thickness of 24 µm. Then, the whole was subjected to drying treatment at 120° C. for 10 minutes, to thereby obtain a substrate-integrated second birefringent layer including a polyimide layer with a thickness of about 2.4 µm. A refractive index profile of the obtained second birefringent layer was nx=ny>nz. The second polarizer was attached to a substrate side of the substrate-integrated second birefringent layer by using a polyvinyl alcohol-based adhesive (thickness: 0.1 µm) such that an absorption axis of the second polarizer and a slow axis of the second birefringent layer were perpendicular to each other. Further, a triacetyl cellulose (TAC) film (thickness: 80 µm) was attached to the second polarizer on a side opposite to the second birefringent layer by using a polyvinyl alcohol-based adhesive (thickness: 0.1 µm).

(Production of Liquid Crystal Panel (4C))

A liquid crystal cell (VA mode) was taken out of a liquid crystal panel (manufactured by SHARP CORPORATION, AQUOS, 32-inch panel), and the polarizing plate-integrated retardation film (4A) and the polarizing plate-integrated retardation film (4B) were attached above and below the liquid crystal cell to sandwich the liquid crystal cell by using an acrylic pressure-sensitive adhesive (thickness: 20 µm) such that absorption axes of polarizers included in the polarizing plate-integrated retardation film (4A) and the polarizing plate-integrated retardation film (4B) were perpendicular to each other. Attachment was conducted such that the polarizing plate-integrated retardation film (4B) was arranged on a backlight side and the polarizing plate-integrated retardation film (4A) was arranged on a viewer side.

(Evaluation)

Figure 16:
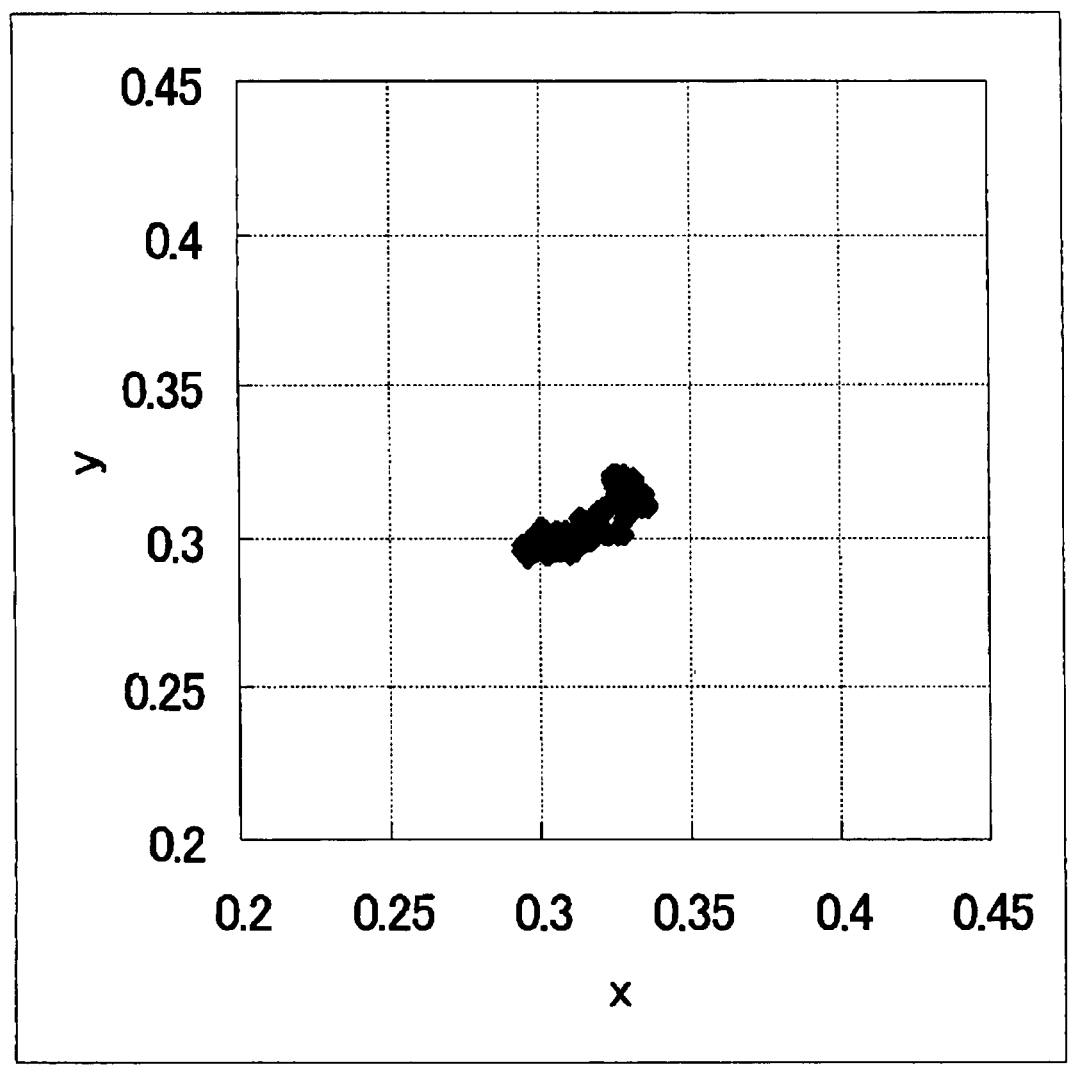
FIG. 16 is an xy chromaticity diagram showing color shift measured in Example 4.
Figure 17:
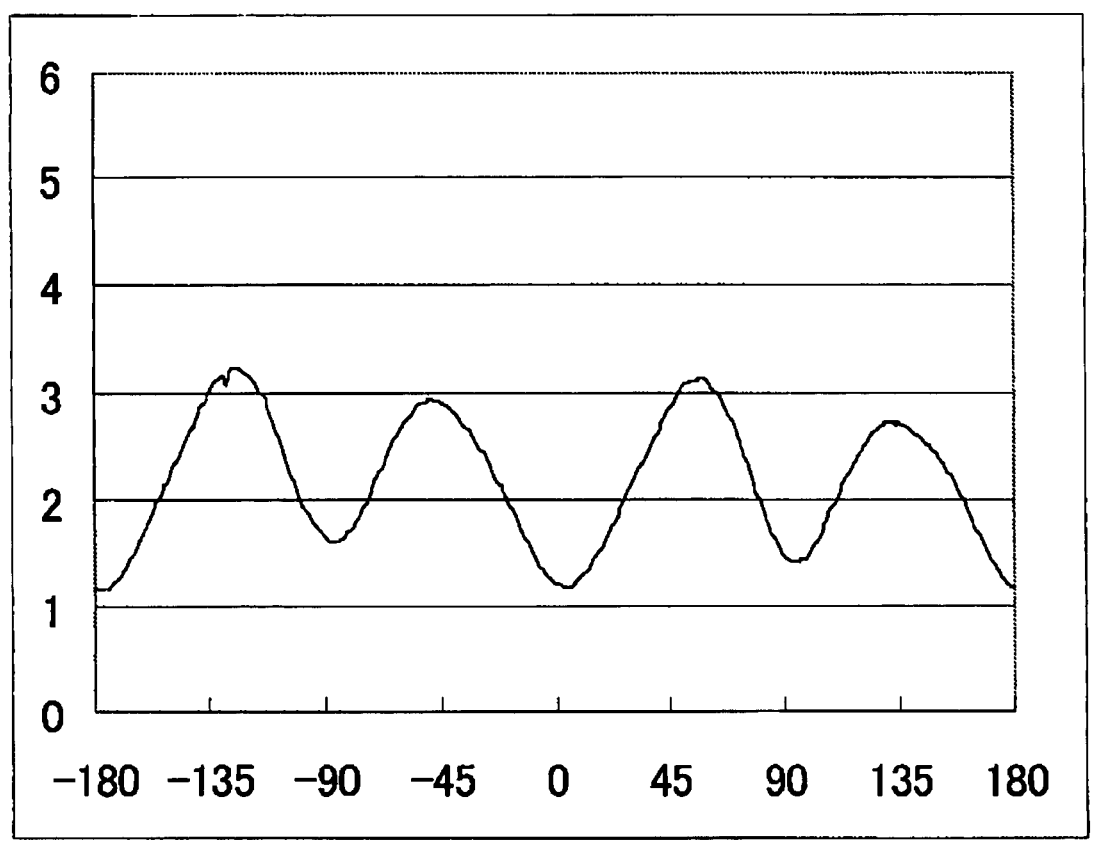
FIG. 17 is a graph showing black luminance measured in Example 4.

The contrast of the obtained liquid crystal panel (4C) was determined following the evaluation method described above. Table 1 shows the results. FIG. 16 shows the measurement results (xy chromaticity diagram) of color shift, and FIG. 17 shows the measurement results of black luminance.

COMPARATIVE EXAMPLE 4
(Production of Polarizing Plate-integrated Retardation Film (C4A))

The polarizing plate-integrated retardation film (C1A) produced in Example 1 was used as it is as a polarizing plate-integrated retardation film (C4A).

(Production of Liquid Crystal Panel (C4C))

A liquid crystal cell (VA mode) was taken out of a liquid crystal panel (manufactured by SHARP CORPORATION, AQUOS, 32-inch panel), and the polarizing plate-integrated retardation film (C4A) and a polarizing plate (trade name: SEG1224) available from Nitto Denko Corporation were attached above and below the liquid crystal cell to sandwich the liquid crystal cell by using an acrylic pressure-sensitive adhesive (thickness: 20 μm) such that absorption axes of polarizers included in the polarizing plate-integrated retardation film (C4A) and SEG1224 were perpendicular to each other. Attachment was conducted such that the polarizing plate-integrated retardation film (C4A) was arranged on a backlight side and SEG1224 was arranged on a viewer side.

(Evaluation)

Figure 18:
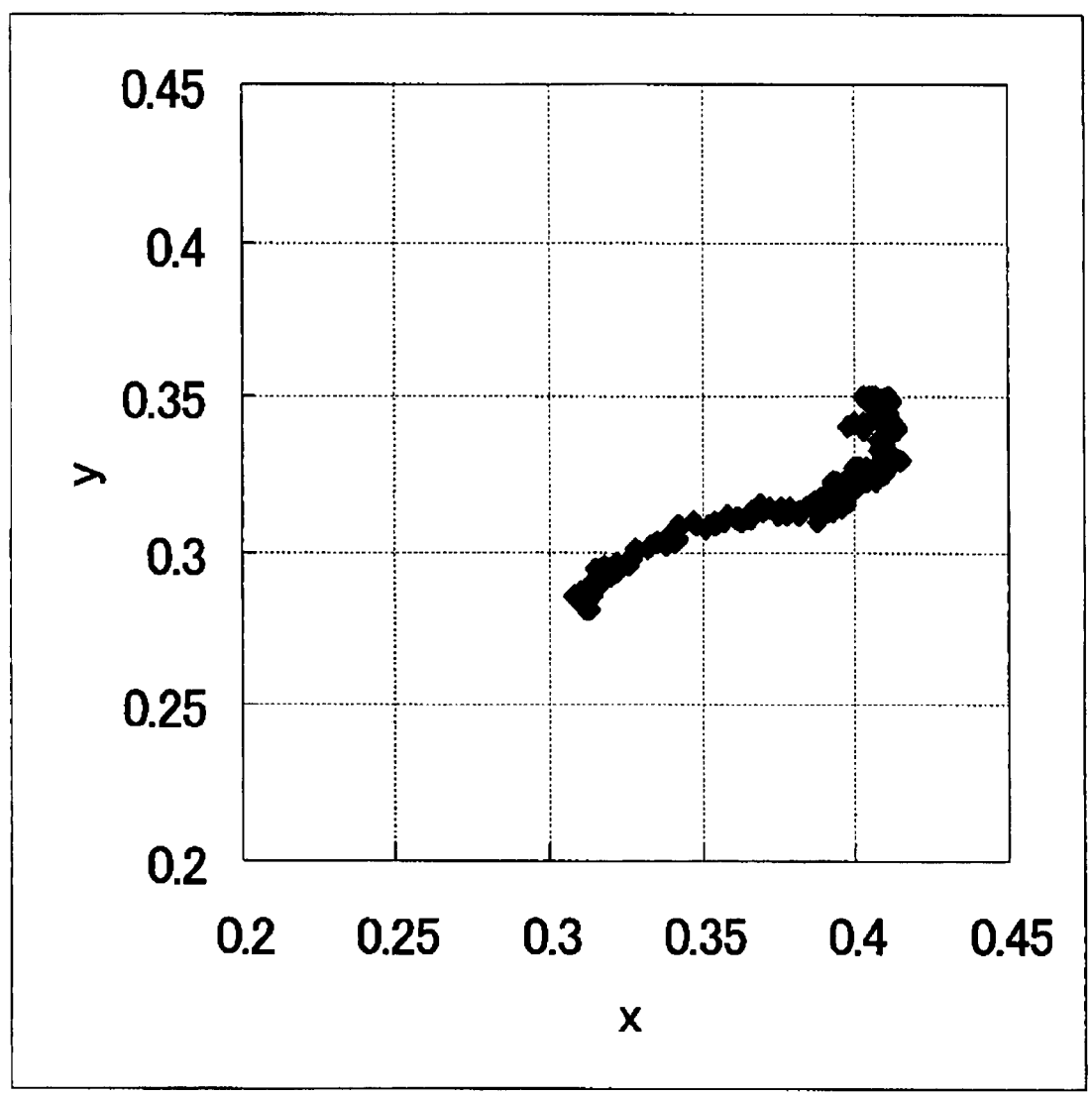
FIG. 18 is an xy chromaticity diagram showing color shift measured in Comparative Example 3.
Figure 19:
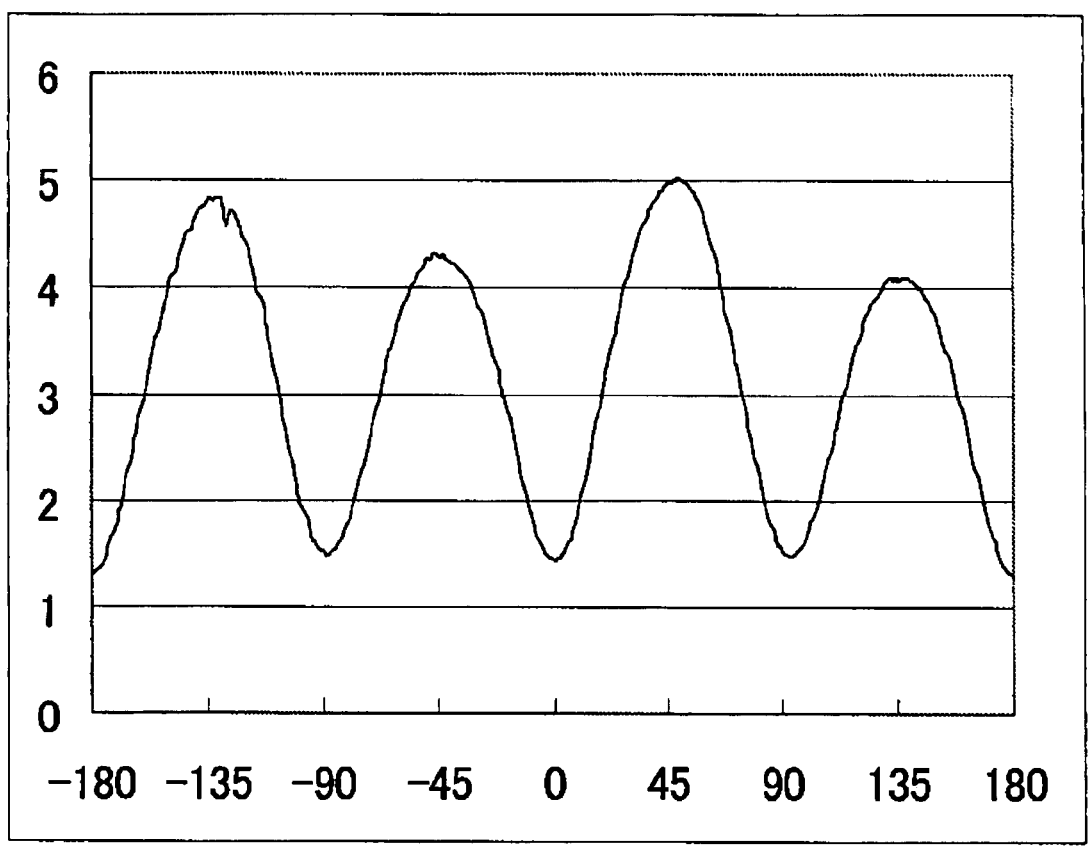
FIG. 19 is a graph showing black luminance measured in Comparative Example 3.

The contrast of the obtained liquid crystal panel (C4C) was determined following the evaluation method described above. Table 1 shows the results. FIG. 18 shows the measurement results (xy chromaticity diagram) of color shift, and FIG. 19 shows the measurement results of black luminance.

TABLE 1

| | Liquid crystal panel | Contrast |
|---|---|---|
| Example 1 | SONY BRAVIA 32 inch | 87 |
| Comparative example 1 | SONY BRAVIA 32 inch | 63 |
| Comparative example 2 | SONY BRAVIA 32 inch | 80 |
| Example 2 | SONY BRAVIA 32 inch | 98 |
| Comparative example 3 | SONY BRAVIA 32 inch | 80 |
| Example 3 | SHARP AQUOS 32 inch | 34 |
| Example 4 | SHARP AQUOS 32 inch | 35 |
| Comparative example 4 | SHARP AQUOS 32 inch | 27 |

Table 1 shows that the liquid crystal panels of the present invention each have a high average value of contrast at a polar angle of 60° and azimuth angles of 45°, 135°, 225°, and 315° and that the liquid crystal panels of the present invention are each a liquid crystal panel suitable for a liquid crystal display apparatus and capable of providing colorless neutral displays in all directions.

FIGS. 6 to 11 show that in Examples 1 and 2, variation of x and y in the xy chromaticity diagram is smaller and black luminance is lower than those of Comparative Example 1. The results indicate that in Examples 1 and 2, the liquid crystal panels each have a higher contrast and a smaller color shift compared with those in Comparative Example 1.

FIGS. 12 and 13 show that in the case where the Nz coefficient of the first birefringent layer is more than 2 in Comparative Example 2, variation of x and y in the xy chromaticity is larger and black luminance is higher than those of Example 2.

FIGS. 14 to 19 show that in Examples 3 and 4, variation of x and y in the xy chromaticity diagram is smaller and black luminance is lower than those of Comparative Example 3. The results indicate that in Examples 3 and 4, the liquid crystal panels each have a higher contrast and a smaller color shift compared with those in Comparative Example 3.

The liquid crystal panel of the present invention and the liquid crystal display apparatus including the liquid crystal panel may suitably be used for a liquid crystal television, a cell phone, and the like.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A liquid crystal panel comprising:
a liquid crystal cell;
a first polarizer arranged on one side of the liquid crystal cell;
a first birefringent layer arranged between the liquid crystal cell and the first polarizer and on a viewer side of the liquid crystal cell;
a second polarizer arranged on another side of the liquid crystal cell; and
a second birefringent layer arranged between the liquid crystal cell and the second polarizer; wherein:
the first birefringent layer has a relationship of $1<Nz \leq 2$ where an Nz coefficient is defined by $Nz=(nx-nz)/(nx-ny)$;
the first birefringent layer comprises a cyclic olefin-based film; and
the second birefringent layer has a refractive index profile of $nx=ny>nz$.

2. A liquid crystal panel according to claim 1, wherein the liquid crystal cell employs one of VA mode and OCB mode.

3. A liquid crystal panel according to claim 1, wherein the cyclic olefin-based film comprises a fixed-end stretched film.

4. A liquid crystal cell according to claim 1, wherein the cyclic olefin-based film comprises a film obtained through stretching at a stretching temperature of 130 to 160° C. and a stretching ratio of 1.2 to 4.0 times.

5. A liquid crystal panel according to claim 1, wherein the second birefringent layer is a coated layer of a non-liquid crystalline material.

6. A liquid crystal panel according to claim 5, wherein the cellulose-based film comprises a film obtained through free-end stretching in an MD direction at a stretching temperature of 120 to 160° C. and a stretching ratio of 1.2 to 2.0 times and free-end stretching in a TD direction at a stretching temperature of 120 to 160° C. and a stretching ratio of 1.01 to 1.05 times.

7. A liquid crystal panel according to claim 5, wherein the non-liquid crystalline material comprises a polymer selected from the group consisting of a polyamide, a polyimide, a polyester, a polyether ketone, a polyamideimide, and a polyesterimide.

8. A liquid crystal display apparatus comprising the liquid crystal panel according to claim 1.

* * * * *